(12) United States Patent
Shinohara et al.

(10) Patent No.: US 8,562,472 B2
(45) Date of Patent: Oct. 22, 2013

(54) TRAVEL DRIVE DEVICE FOR DUMP TRUCK

(75) Inventors: Takeshi Shinohara, Omitama (JP);
Takeshi Shibukawa, Abiko (JP);
Shinichiro Hagihara, Tsuchiura (JP);
Naoyuki Inoue, Tsuchiura (JP); Kyoko Tanaka, Namegata (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/548,740

(22) Filed: Jul. 13, 2012

(65) Prior Publication Data
US 2013/0065724 A1 Mar. 14, 2013

(30) Foreign Application Priority Data
Sep. 12, 2011 (JP) ................................. 2011-198472

(51) Int. Cl.
*F16H 57/04* (2010.01)
(52) U.S. Cl.
USPC ........................................................ 475/159
(58) Field of Classification Search
USPC ........................................................ 475/159
See application file for complete search history.

(56) References Cited

U.S. PATENT DOCUMENTS

| 3,583,526 A | 6/1971 | Mulleder et al. |
| 4,334,590 A | 6/1982 | Plumb |
| 7,585,244 B2 * | 9/2009 | Jurado et al. ................. 475/159 |
| 2005/0059523 A1 * | 3/2005 | Hasegawa et al. ............ 475/159 |
| 2009/0312135 A1 | 12/2009 | Shibukawa et al. |

FOREIGN PATENT DOCUMENTS

| CN | 201145024 Y | 11/2008 |
| EP | 0054852 A1 | 6/1982 |
| EP | 1852634 A1 | 11/2007 |
| JP | 2009-204016 A | 9/2009 |
| JP | 2010-116963 A | 5/2010 |

* cited by examiner

*Primary Examiner* — Edwin A Young
(74) *Attorney, Agent, or Firm* — Mattingly & Malur, PC

(57) ABSTRACT

A rotational shaft is provided in a spindle, a wheel mounting cylinder is provided which is mounted through wheel support bearings on an outer peripheral side of the spindle, and a planetary gear reduction mechanism is provided for decelerating rotation of the rotational shaft, which is transmitted to the wheel mounting cylinder. A carrier forming a part of the planetary gear reduction mechanism is mounted in a non-rotating state on an open end side of the spindle. A cylindrical coupling member is provided between an open side of the spindle and the carrier. An oil guide path is formed between a one-side end surface of each of planetary gears and an opposing surface portion of a cylindrical coupling member for guiding lubricant oil ejected from a meshing part therebetween to a planetary gear bearing.

6 Claims, 8 Drawing Sheets

US 8,562,472 B2

TRAVEL DRIVE DEVICE FOR DUMP TRUCK

TECHNICAL FIELD

The present invention relates to a travel drive device for a dump truck which is suitably used in transporting crushed stones excavated from such as an open-pit stope, a stone quarry or a mine.

BACKGROUND ART

In general, a large-sized transporter vehicle called a dump truck has a liftable vessel (loading platform) on a frame of a vehicle body, and transports crushed stones or the like in a state of the heavy baggage such as crushed stones being loaded in a large quantity on the vessel.

Therefore, each travel drive device for driving drive wheels of the dump truck for traveling is provided with an axle housing mounted in a non-rotating state on a vehicle body and having a tip end side opened to form a cylindrical spindle, a rotational shaft provided to axially extend in the spindle of the axle housing and driven and rotated by a drive source, a wheel mounting cylinder which is rotatably mounted on an outer peripheral side of the spindle through wheel support bearings and to which vehicle wheels are mounted, a reduction gear mechanism provided between the wheel mounting cylinder and the spindle to decelerate rotation of the rotational shaft, which is transmitted to the wheel mounting cylinder, and lubricant oil accommodated in a bottom side of the wheel mounting cylinder in a state of being reserved therein to lubricate the reduction gear mechanism (Patent Documents 1 and 2).

The reduction gear mechanism is constituted by a multi-stage planetary gear reduction mechanism comprising a sun gear arranged on an outer peripheral side of the rotational shaft and rotating with rotation of the rotational shaft, a plurality of planetary gears meshing with the sun gear and a ring-shaped internal gear, and a carrier rotatably supporting the respective planetary gears through support pins. The carrier forming apart of a final-stage planetary gear reduction mechanism is configured to be mounted in a non-rotating state on an open end side of the spindle.

PRIOR ART DOCUMENTS

Patent Documents

Patent Document 1: Japanese Patent Laid-Open No. 2009-204016 A
Patent Document 2: Japanese Patent Laid-Open No. 2010-116963 A

SUMMARY OF THE INVENTION

Incidentally, according to the travel drive device for the dump truck according to the aforementioned conventional art, since the carrier used for the final-stage planetary gear reduction mechanism is mounted in a non-rotating state on the open end side of the spindle, the carrier and the spindle are coupled by a spline-coupling portion formed of a male spline and a female spline. However, this spline-coupling portion does not necessarily have sufficient strength in a case where a loading weight of the dump truck is increased to, for example, 250 tons or more, and a further improvement on the coupling portion is needed.

In addition, since rotation of the carrier is restrained by the spindle in the final-stage planetary gear reduction mechanism, at least a part of a plurality of planetary gears supported by this carrier repeats the rotation in a state of being exposed from an oil surface of the lubricant oil. Therefore, it is difficult to supply a sufficient amount of the lubricant oil to a support pin and a planetary gear bearing rotatably (rotatably on its axis) supporting the planetary gear, creating a problem with possible occurrence of lubrication lack.

In view of the above-discussed problem with the conventional art, it is an object of the present invention to provide a travel drive device for a dump truck which can enhance the strength to a rotational load by providing a separate coupling member between an open end side of a spindle and a carrier to improve durability and lifetime of an entire device.

Further, another object of the present invention is to provide a travel drive device for dump truck which can guide lubricant oil between a planetary gear performing only a rotational movement without performing a revolving movement and a support pin to maintain a lubricating state between the planetary gear and the support pin, thus enhancing durability and reliability of an entire device.

(1) In order to solve the aforementioned problem, the present invention is applied to a travel drive device for a dump truck comprising an axle housing mounted in a non-rotating state on a vehicle body of a dump truck and having an end side opened to form a cylindrical spindle; a rotational shaft provided to axially extend in the spindle of the axle housing and driven and rotated by a drive source; a wheel mounting cylinder which is rotatably provided on an outer peripheral side of the spindle through wheel support bearings and to which wheels are mounted; a planetary gear reduction mechanism provided between the wheel mounting cylinder and the spindle to decelerate rotation of the rotational shaft, which is transmitted to the wheel mounting cylinder; and lubricant oil accommodated in a bottom side of the wheel mounting cylinder in a state of being reserved therein to lubricate the planetary gear reduction mechanism, the planetary gear reduction mechanism comprising a sun gear arranged on an outer peripheral side of the rotational shaft and rotating with rotation of the rotational shaft; a plurality of planetary gears meshing with the sun gear for rotation; and a carrier rotatably supporting each of the plurality of the planetary gears through a support pin, wherein the carrier is mounted in a non-rotating state on an open end side of the spindle.

A characteristic of a construction adopted by the present invention lies in that a cylindrical coupling member which is formed as a coupling member for connecting the spindle and the carrier is provided between the spindle and the carrier and the rotational shaft is inserted in an inner peripheral side of the cylindrical coupling member, the cylindrical coupling member is provided with an opposing surface portion positioned higher than a liquid surface level of the lubricant oil and opposing through an axial gap a meshing part between the sun gear and each of the planetary gears, and an oil guide path is formed between each of the planetary gears and the opposing surface portion and guides the lubricant oil ejected from the meshing part between the sun gear and each of the planetary gears in between each of the planetary gears and each of the support pins.

With this arrangement, the spindle and the carrier can be connected in a non-rotating state by using the cylindrical coupling member made up of the single, independent member, increasing the strength to the rotational load, as well as improving durability and lifetime of an entire travel drive device. On the other hand, by restraining the rotation of the carrier, the lubricant oil axially ejected from the meshing part between the sun gear and each of the planetary gears can be guided through the oil guide path between the support pin and the planetary gear repeatedly performing only the rotational movement without performing the revolving movement. Therefore, the lubricating state can be maintained between the planetary gear and the support pin to enhance the durability and the reliability of the entire device.

Namely, the cylindrical coupling member has the opposing surface portion opposing the meshing part between the sun gear and each of the planetary gears through the axial gap. Therefore, the lubricant oil ejected from the meshing part between the sun gear and each of the planetary gears can be trapped in the oil guide path between the opposing surface portion of the cylindrical coupling member and the end surface of each of the planetary gears to be guided between the planetary gear and the support pin. As a result, the planetary gear bearing provided between the planetary gear and the support pin can be maintained in a lubricating state.

(2) According to the present invention, the sun gear is configured such that an axial one-side end surface projects closer to an axial one side of the opposing surface portion of the cylindrical coupling member than an end surface of each of the planetary gears to be close to the opposing surface portion of the cylindrical coupling member to narrow the gap.

With this arrangement, since the end surface of the sun gear in the axial one side is close to the opposing surface portion of the cylindrical coupling member, the gap formed between them can be narrowed. Therefore, the lubricant oil ejected from the meshing part between the sun gear and each of the planetary gears can be trapped in the oil guide path to be guided between the planetary gear and the support pin. As a result, the planetary gear bearing provided between the planetary gear and the support pin can be maintained in a lubricating state.

(3) According to the present invention, each of the planetary gears is provided with an annular step portion extending over an entire circumference between an outer diameter side section meshing with the sun gear and an inner diameter side section supported through a planetary gear bearing by the support pin, wherein the annular step portion forms a part of the oil guide path for guiding the lubricant oil ejected from the meshing part between the sun gear and each of the planetary gears in between each of the planetary gears and each of the support pins.

With this arrangement, the annular step portion provided in each of the planetary gears can efficiently trap the lubricant oil ejected from the meshing part between the sun gear and each of the planetary gears. The trapped lubricant oil can be guided between the planetary gear and the support pin with rotation (rotation on its axis) of the planetary gear.

(4) According to the present invention, each of the planetary gears is provided with a plurality of oil reservoirs formed in a one-side end surface axially opposing the opposing surface portion of the cylindrical coupling member, wherein each of the oil reservoirs temporarily reserves the lubricant oil ejected from the meshing part between the sun gear and each of the planetary gears therein to form apart of the oil guide path.

With this arrangement, each of the plurality of the oil reservoirs formed in the end surface of each of the planetary gears can trap and temporarily reserve therein the lubricant oil ejected from the meshing part between the sun gear and each of the planetary gears. The lubricant oil can be guided between the planetary gear and the support pin with rotation (rotation on its axis) of the planetary gear.

(5) According to the present invention, the opposing surface portion of the cylindrical coupling member is provided with a guide projection for beating off the lubricant oil ejected from the meshing part between the sun gear and each of the planetary gears toward a radial outside.

With this arrangement, the guide projection provided in the opposing surface portion of the cylindrical coupling member can beat off the lubricant oil ejected from the meshing part between the sun gear and each of the planetary gears toward the radial outside. The lubricating state can be maintained in the planetary gear bearing between the planetary gear and the support pin by guiding the beat lubricant oil in between each of the planetary gears and the support pin.

(6) According to the present invention, the opposing surface portion of the cylindrical coupling member is provided with a plurality of oil guide groove portions radially extending from an inner peripheral side of the opposing surface portion toward the carrier to guide the lubricant oil ejected from the meshing part between the sun gear and each of the planetary gears in between each of the planetary gears and each of the support pins.

With this arrangement, the plurality of the oil guide groove portions provided in the opposing surface portion of the cylindrical coupling member radially extend from the inner peripheral side to the carrier side. Therefore, the lubricant oil ejected from the meshing part between the sun gear and each of the planetary gears can be guided in between each of the planetary gears and each of the support pins to maintain the planetary gear bearing to be in a lubricating state.

(7) According to the present invention, a surface of the carrier opposing the planetary gear is provided with a plurality of oil guide groove portions radially extending from a side of the opposing surface portion of the cylindrical coupling member to a side of each of the support pins to guide the lubricant oil ejected from the meshing part between the sun gear and each of the planetary gears in between each of the planetary gears and each of the support pins.

With this arrangement, the plurality of the oil guide groove portions provided on the surface of the carrier opposing the planetary gear radially extend from the side of the opposing surface portion of the cylindrical coupling member to the side of each of the support pins. Therefore, the lubricant oil ejected from the meshing part between the sun gear and each of the planetary gears can be guided in between each of the planetary gears and each of the support pins to maintain the planetary gear bearing to be in a lubricating state.

MODE FOR CARRYING OUT THE INVENTION

Figure 1:
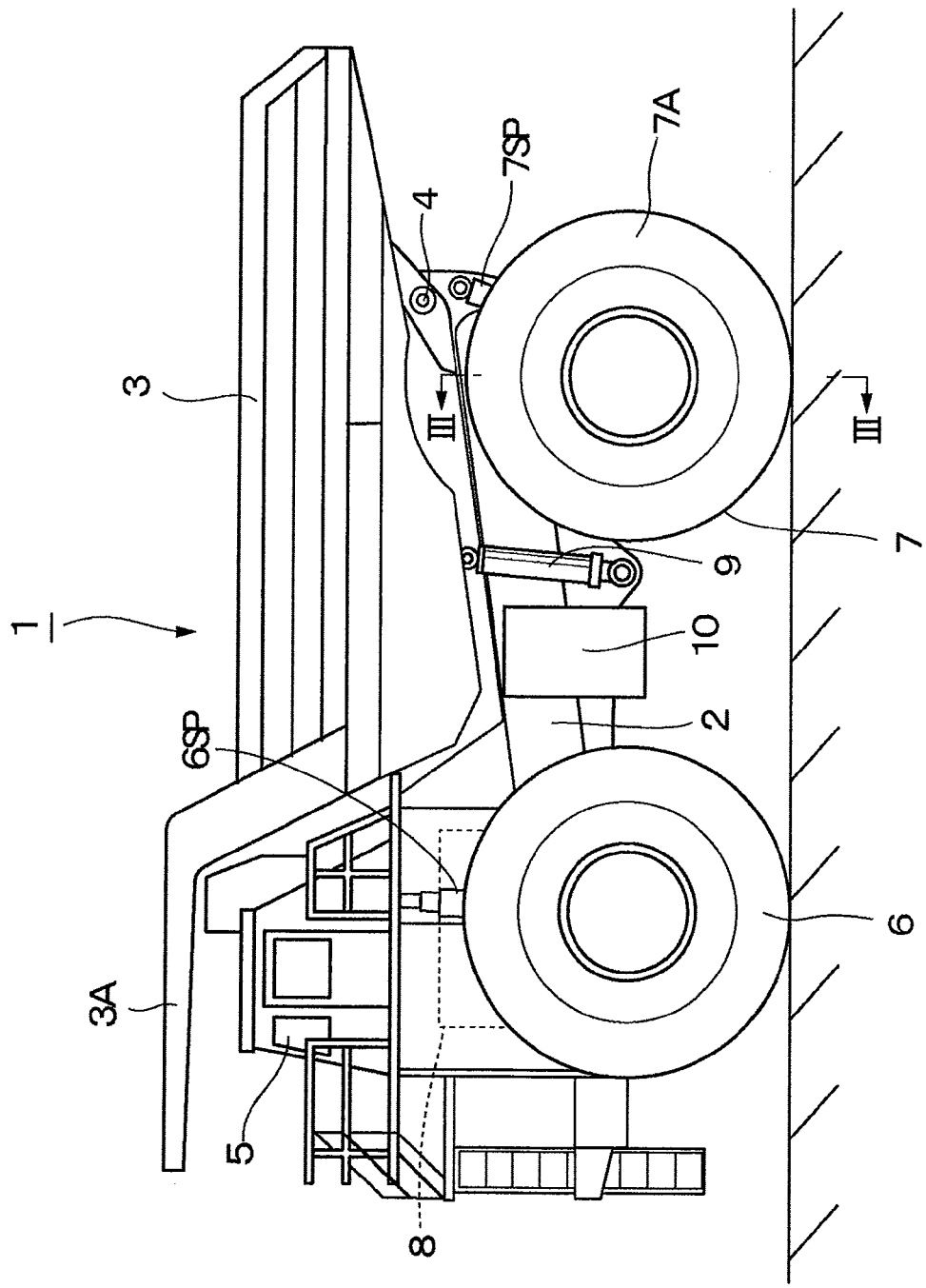
FIG. 1 is a side view showing a dump truck to which a travel drive device according to a first embodiment of the present invention is applied.

Hereinafter, a travel drive device for a dump truck according to embodiments of the present invention will be in detail explained with reference to the accompanying drawings by taking a dump truck of a rear-wheel drive type as an example.

FIG. 1 to FIG. 5 show a travel drive device for a dump truck according to a first embodiment in the present invention.

In the figure, designated at 1 is a dump truck of a large-sized transporter vehicle adopted in the first embodiment. The dump truck 1 is constituted by including a vehicle body 2 having a strong frame structure and a vessel 3 as a loading platform liftably mounted on the vehicle body 2.

The vessel 3 is formed, for example, as a large-sized container of an entire length of 9 to 13 meters for loading a large volume of heavy baggage such as crushed stones. A rear-side bottom portion of the vessel 3 is liftably (tiltably) connected to a rear end side of the vehicle body 2 through a connecting pin 4. A protector 3A is integrally provided in a front-side top portion of the vessel 3 in such a manner as to cover a cab 5 to be described later from the upper side.

The cab 5 is provided in the front portion of the vehicle body 2 to be positioned under the protector 3A. The cab 5 forms an operator's room which an operator of the dump truck 1 gets in and off. An operator's seat, an activation switch, an accelerator pedal, a brake pedal, a handle for steering, and a plurality of operating levers (any of them is not shown) are provided inside the operator's room. The protector 3A of the vessel 3 has functions of protecting the cab 5 from flying stones such as rocks by substantially completely covering the cab 5 from the upper side, and protecting an operator inside the cab 5 at the falling-down of a vehicle (dump truck 1).

Left and right front wheels 6 are rotatably provided on the front side of the vehicle body 2. Each front wheel 6 forms a steered wheel which is steered by an operator of the dump truck 1. Further, the front wheel 6 is formed in a tire diameter (outer diameter dimension), for example, as long as 3 to 4 meters in the same way as each of rear wheels 7 to be described later. A front-wheel side suspension 6SP formed by a hydraulic shock absorber is provided between the front portion of the vehicle body 2 and the front wheel 6.

Figure 3:
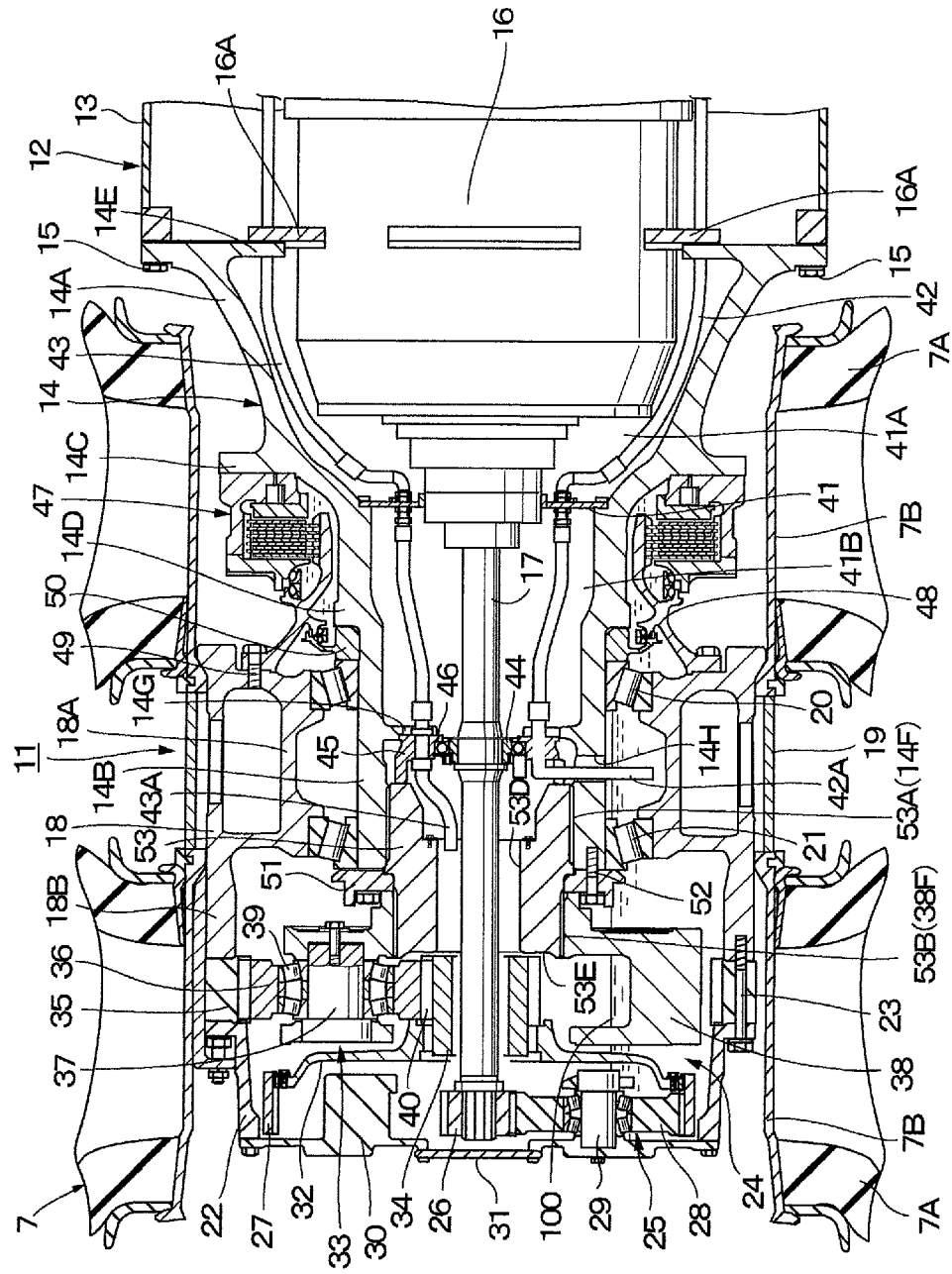
FIG. 3 is an enlarged cross section showing the travel drive device in the rear wheel side, as viewed in the direction of arrows III-III in FIG. 1.

The left and right rear wheels 7 are rotatably provided on the rear side of the vehicle body 2. Each rear wheel 7 forms a drive wheel of the dump truck 1 which is driven and rotated integrally with a wheel mounting cylinder 18 by a travel drive device 11 to be described later as shown in FIG. 3. Each rear wheel 7 is constituted by including dual tires of an inner tire 7A and an outer tire 7A, and rims 7B disposed in a radial inside of the respective tires 7A. A rear-wheel side suspension 7SP formed by a hydraulic shock absorber is provided between the rear portion of the vehicle body 2 and the rear wheel 7.

An engine 8 is provided in the vehicle body 2 to be positioned under the cab 5. The engine 8 is constituted by, for example, a large-sized diesel engine and drives an on-board power generator and a hydraulic pump as a hydraulic source (any thereof is not shown) for rotation. Pressurized oil discharged from the hydraulic pump is supplied to hoist cylinders 9, a steering cylinder for power steering (not shown) and the like to be described later.

The hoist cylinder 9 is a cylinder apparatus for lifting the vessel 3. The hoist cylinder 9 is positioned between the front wheel 6 and the rear wheel 7 to be disposed in each of both left and right sides of the vehicle body 2. Each of the hoist cylinders 9 is mounted between the vehicle body 2 and the vessel 3 to telescopically operate in the upper-lower direction. Each of the hoist cylinders 9 expands and contracts in the upper-lower direction by supply/discharge of the pressurized oil from/to the hydraulic pump to lift (tilt) the vessel 3 around the connecting pin 4 of the rear side.

As shown in FIG. 1, an operating oil tank 10 is mounted to a side of the vehicle body 2 or the like to be positioned under the vessel 3. Operating oil accommodated in the operating oil tank 10 is suctioned by the hydraulic pump and discharged therefrom to be pressurized, which is supplied/discharged to/from the hoist cylinder 9, the steering cylinder for power steering, and the like.

Next, an explanation will be made of the travel drive device 11 which is provided to the side of the rear wheel 7 in the dump truck 1 and forms a key part of the first embodiment.

The travel drive device 11 is constituted by including an axle housing 12, a wheel drive motor 16, a wheel mounting cylinder 18 and a reduction gear mechanism 24, which will be described later. The travel drive device 11 decelerates rotation of the wheel drive motor 16 by the reduction gear mechanism 24 and drives the rear wheels 7 as drive wheels of a vehicle together with the wheel mounting cylinder 18 by large rotational torque.

Designated at 12 is the axle housing for the rear wheel 7, which is provided under the rear side of the vehicle body 2, and the axle housing 12 is formed in a cylindrical body which axially extends between the left and right rear wheels 7. The axle housing 12 is constituted by an intermediate cylindrical body 13 mounted to the rear side of the vehicle body 2 through the rear-wheel side suspension 7SP and a spindle 14 mounted to each of both left and right sides of the cylindrical body 13, which will be described later.

The spindles 14 are provided respectively at axial both sides of the axle housing 12 and each spindle 14 is formed in a cylindrical body. As shown in FIG. 3, the spindle 14 is constituted by including a large-diameter cylindrical portion 14A positioned at an axial one side, formed to be tapered and removably fixed to the cylindrical body 13 through bolts 15, and a circular cylindrical portion 14B which is formed integrally with the large-diameter cylindrical portion 14A at an axial other side and a tip end side of which is opened. The circular cylindrical portion 14B is arranged to axially extend within the wheel mounting cylinder 18 to be described later. An outer peripheral side of the circular cylindrical portion 14B rotatably supports the wheel mounting cylinder 18 in the side of the rear wheel 7 through wheel support bearings 20 and 21 to be described later.

Here, the spindle 14 has an outer peripheral side formed integrally with an annular flange portion 14C which radially outwardly projects from an intermediate section of the large-diameter cylindrical portion 14A in a length direction (axially) and to which a wet brake 47 is mounted, and with an annular step portion 14D provided to the circular cylindrical portion 14B at an axial one side for axially positioning a one-side retainer 50. A plurality of motor mounting seats 14E are formed integrally to the large-diameter cylindrical portion 14A at one side in an axial direction to radially inwardly project therefrom, and wheel drive motors 16 to be described later are mounted to the motor mounting seats 14E.

On the other hand, an axial other side (tip end side) of the circular cylindrical portion 14B is formed as an open end, and an inner peripheral side thereof is provided with a female spline 14F (refer to FIG. 4) formed thereon. The female spline 14F is spline-coupled to a first male spline 53A of a cylindrical coupling member 53 to be described later. In regard to the male spline 53A, each tooth flank is subjected to a modification process (for example, a crowning process). Thereby, the female spline 14F can make a tooth contact of each tooth face with the first male spline 53A uniform.

A circular inward projecting portion 14G is formed integrally on an inner peripheral side of the circular cylindrical portion 14B at an axial intermediate section, and a bearing retainer 45 to be described later is mounted to the inward projecting portion 14G through bolts. A radial hole 14H is formed in the lower part of the circular cylindrical portion 14B to penetrate and extend therethrough from an inner diameter side to an outer diameter side of the circular cylindrical portion 14B (radial direction of the circular cylindrical portion 14B), and a suction pipe 42 to be described later is inserted into the radial hole 14H.

Figure 2:
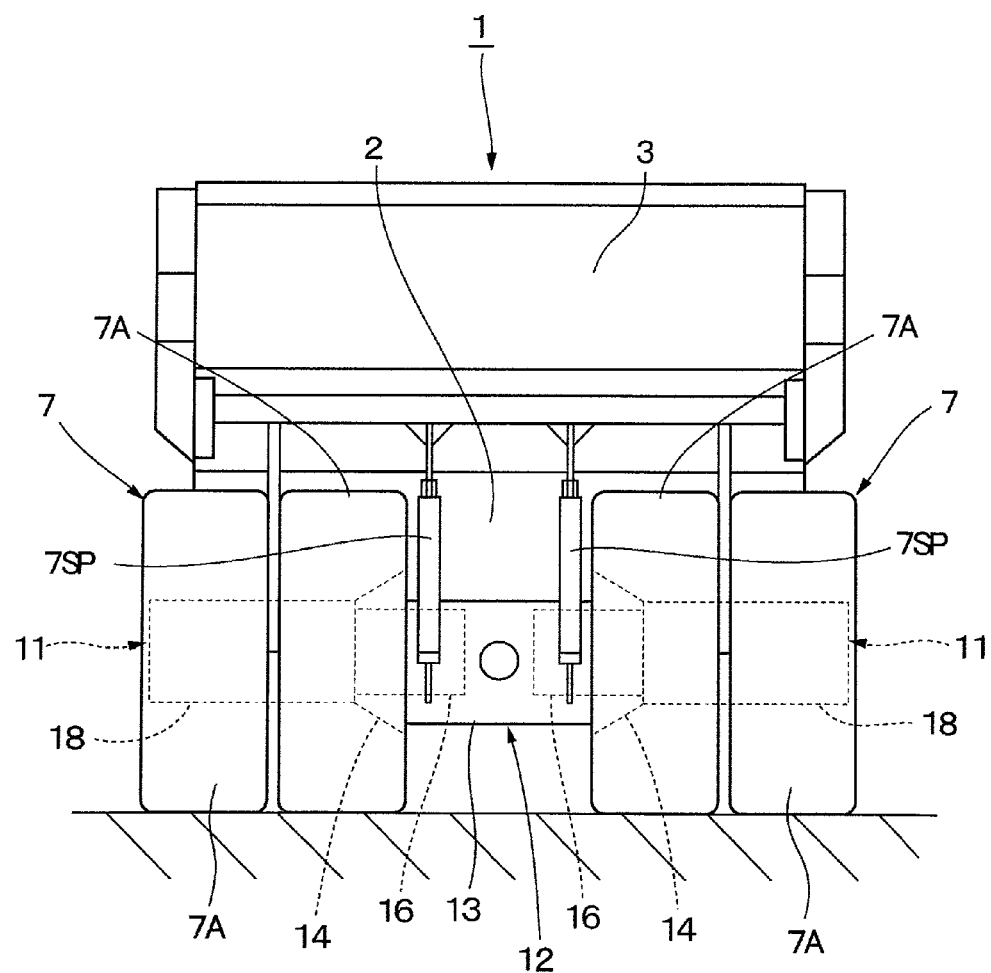
FIG. 2 is a rear view showing the dump truck in FIG. 1 as viewed from the backside.

The wheel drive motor 16 is removably mounted in the axle housing 12, and the wheel drive motor 16 is used as a drive source of the rear wheel 7. The wheel drive motor 16 is formed of a large-sized electric motor driven and rotated by power supply from a power generator (not shown) mounted on the vehicle body 2. As shown in FIG. 2, each of the wheel drive motors 16 is mounted within the spindle 14 to be position in each of left and right sides of the cylindrical body 13 to drive and rotate the left and right rear wheels 7 and 7 independently with each other. The wheel drive motor 16 is provided at an outer peripheral side with a plurality of mounting flanges 16A which are removably mounted to the motor mounting seat 14E of the spindle 14 by using bolts. The wheel drive motor 16 is configured to drive and rotate a rotational shaft 17 by supplying power from the power generator.

The rotational shaft 17 is configured as an output shaft of the wheel drive motor 16 and is driven and rotated in the forward or backward direction by the wheel drive motor 16. The rotational shaft 17 is formed of a single, elongated, bar-shaped body extending in an axial direction (left and right directions) at the inner peripheral side of the spindle 14, and one end side of the rotational shaft 17 is connected to an output side of the wheel drive motor 16. On the other hand, the other end side of the rotational shaft 17 projects from an open end side of the circular cylindrical portion 14B forming the spindle 14 and to a projecting end of which a sun gear 26 to be described later is mounted. An axial intermediate section of the rotational shaft 17 is positioned between the wheel support bearings 20 and 21 to be described later and is rotatably supported in the spindle 14 by using a rotational shaft bearing 46 to be described later.

Denoted at 18 is the wheel mounting cylinder rotating integrally with the rear wheel 7 as a wheel. The wheel mounting cylinder 18 forms a so-called wheel hub, and has the outer peripheral side to which each rim 7B of the rear wheel 7 is removably mounted by means such as press-fitting. The wheel mounting cylinder 18 is integrally formed of a hollow cylindrical portion 18A axially extending between the wheel support bearings 20 and 21 to form a hollow structure, and an extending cylindrical portion 18B axially extending from an outer peripheral end portion of the hollow cylindrical portion 18A toward an internal gear 35 to be described later. Accordingly, the wheel mounting cylinder 18 is formed as an integral object in a stepped cylindrical shape as a whole.

The internal gear 35 and an outer drum 22 to be described later are integrally fixed to the extending cylindrical portion 18B of the wheel mounting cylinder 18 by using long bolts 23. Therefore, the wheel mounting cylinder 18 is rotated integrally with the internal gear 35. That is, rotation of large torque obtained by decelerating the rotation of the wheel drive motor 16 with the reduction gear mechanism 24 is transmitted to the wheel mounting cylinder 18 through the internal gear 35. Therefore, the wheel mounting cylinder 18 rotates the rear wheel 7 as the drive wheel in a vehicle with the large rotational torque.

A rim spacer 19 is formed by a cylindrical ring. The rim spacer 19 is arranged at the outer peripheral side of the wheel mounting cylinder 18 to ensure a predetermined axial gap between an inner tire 7A and an outer tire 7A in the rear wheel 7. That is, as shown in FIG. 3, the rim spacer 19 is sandwiched tightly between a rim 7B in an axial inside and a rim 7B in an axial outside of the rear wheel 7 to keep a space therebetween to be axially constant.

Denoted at 20 and 21 are the wheel support bearings for rotatably supporting the wheel mounting cylinder 18 on the outer peripheral side of the spindle 14 and the wheel support bearings 20 and 21 are configured, for example, by using the same tapered roller bearing or the like. The wheel support bearings 20 and 21 are arranged to be spaced apart axially between the circular cylindrical portion 14B of the spindle 14 and the hollow cylindrical portion 18A of the wheel mounting cylinder 18. That is, the one wheel support bearing 20 is positioned to the annular step portion 14D of the spindle 14 through the one-side retainer 50 to be described later and the other wheel support bearing 21 is positioned to an open end-side outer periphery of the circular cylindrical portion 14B through an end retainer 51 to be described later.

Each inner race of the wheel support bearings 20 and 21 is axially positioned between the retainers 50 and 51 to the circular cylindrical portion 14B of the spindle 14. Each outer race of the wheel support bearings 20 and 21 is axially positioned to the hollow cylindrical portion 18A of the wheel mounting cylinder 18. Therefore, the wheel mounting cylinder 18 is axially positioned to the spindle 14 by using the wheel support bearings 20 and 21 and the retainers 50 and 51, and is supported to the spindle 14 to be rotatable in a circumferential direction thereto.

The outer drum 22 forms a part of the wheel mounting cylinder 18 together with the internal gear 35. As shown in FIG. 3, the outer drum 22 is mounted in a position at an axial outside of the wheel mounting cylinder 18 to sandwich the internal gear 35 to be described later therebetween and is removably fixed to the wheel mounting cylinder 18 by using a plurality of long bolts 23.

Next, an explanation will be made of the reduction gear mechanism 24 provided between the spindle 14 and the wheel mounting cylinder 18.

The reduction gear mechanism 24 is constituted by a first-stage planetary gear reduction mechanism 25 and a final-stage planetary gear reduction mechanism 33 as a second stage, which will be described later. The reduction gear mechanism 24 decelerates rotation of the wheel drive motor 16 (that is, rotational shaft 17), which is transmitted to the wheel mounting cylinder 18 at the side of the rear wheel 7. Therefore, the wheel mounting cylinder 18 at the side of the rear wheel 7 is driven and rotated together with the rear wheel 7 by a large rotational force (torque) obtained by the deceleration.

Denoted at 25 is the first-stage planetary gear reduction mechanism forming the reduction gear mechanism 24, and the first-stage planetary gear reduction mechanism 25 is constituted by the sun gear 26 spline-coupled to the tip end side as a free end of the rotational shaft 17, a plurality (for example, three or four pieces) of planetary gears 28 meshed with the sun gear 26 and a ring-shaped internal gear 27, and a carrier 30 rotatably supporting the respective planetary gears 28 through support pins 29.

Here, the carrier 30 is removably fixed at its outer peripheral side to an open end (an end surface at an axially outside) of the outer drum 22 integral with the wheel mounting cylinder 18 through bolts, and rotates integrally with the wheel mounting cylinder 18 and the outer drum 22. For example, a disk-shaped lid plate 31 is removably mounted to the inner peripheral side of the carrier 30. The lid plate 31 is removed from the carrier 30, for example, at the time of inspection or maintenance of meshing parts between the sun gear 26 and the planetary gears 28.

The ring-shaped internal gear 27 is formed by using a ring gear to surround the sun gear 26 and the respective planetary gears 28 from a radial outside, and the internal gear 27 is relatively rotatably located as having a radial gap to an inner peripheral surface of the outer drum 22. The rotation (revolving movement) of the internal gear 27 is transmitted to a second-stage planetary gear reduction mechanism 33 through a coupling 32 to be described later.

As the sun gear 26 is rotated integrally with the rotational shaft 17 by the wheel drive motor 16, the first-stage planetary gear reduction mechanism 25 converts the rotation of the sun gear 26 into a rotating movement of each of the planetary gears 28 and a revolving movement thereof. Further, the rotating movement (rotation) of each of the planetary gears 28 is transmitted to the ring-shaped internal gear 27 as a decelerated rotation. The rotation of the internal gear 27 is transmitted to the second-stage planetary gear reduction mechanism 33 through the coupling 32 to be described later. On the other hand, the revolving movement of each of the planetary gears 28 is transmitted to the outer drum 22 in the side of the wheel mounting cylinder 18 by way of rotation of the carrier 30. However, since the wheel mounting cylinder 18 rotates integrally with the second-stage internal gear 35 to be described later, the revolving movement of each of the planetary gears 28 is suppressed into rotation in synchronization with the internal gear 35 (the wheel mounting cylinder 18).

The coupling 32 rotates integrally with the first-stage internal gear 27, and the coupling 32 is in the form of an annular rotation transmitting member which is located in a position between the first-stage planetary gear reduction mechanism 25 and the second-stage planetary gear reduction mechanism 33. That is, an outer peripheral side of the coupling 32 is spline-coupled to the first-stage internal gear 27. An inner peripheral side of the coupling 32 is spline-coupled to a second-stage sun gear 34 to be described later. Thus, the coupling 32 transmits rotation of the first-stage internal gear 27 to the second-stage sun gear 34 to rotate the sun gear 34 integrally with the first-stage internal gear 27. A plurality of oil holes may be formed in the coupling 32 to circulate lubricant oil 100 to be described later in the front-rear direction (axial direction).

Denoted at 33 is the second-stage planetary gear reduction mechanism as a final stage, this planetary gear reduction mechanism 33 is located between the rotational shaft 17 and the wheel mounting cylinder 18 through the first-stage planetary gear reduction mechanism 25 and decelerates the rotation of the rotational shaft 17 together with the first-stage planetary gear reduction mechanism 25. The second-stage planetary gear reduction mechanism 33 is constituted by the cylindrical sun gear 34 which is positioned on an outer peripheral side of the rotational shaft 17 to be mounted coaxially with the rotational shaft 17 and rotates integrally with the coupling 32 according to rotation of the rotational shaft 17, a plurality of planetary gears 36 (only one of which is shown in the figure) which are meshed with the sun gear 34 and the ring-shaped internal gear 35, and a carrier 38 which rotatably supports the respective planetary gears 36 through support pins 37.

A planetary gear bearing 39 is provided between an inner peripheral side of each of the planetary gears 36 and each of the support pins 37, which is composed of, for example, two conical bearings backsides of which oppose to each other. The planetary gear bearing 39 supports the planetary gear 36 together with the support pin 37 to be rotatable to the carrier 38. Each of the planetary gears 36 is provided with an annular step portion 36A extending over an entire circumference in the radial intermediate portion (that is, an intermediate portion between an outer diameter side section meshing with the sun gear 34 and an inner diameter side section supported through the planetary gear bearing 39 by the support pin 37). The annular step portion 36A temporarily traps the lubricant oil 100 to be described later on the inner surface and forms a part of an oil guide path 55 to be described later.

Figure 5:
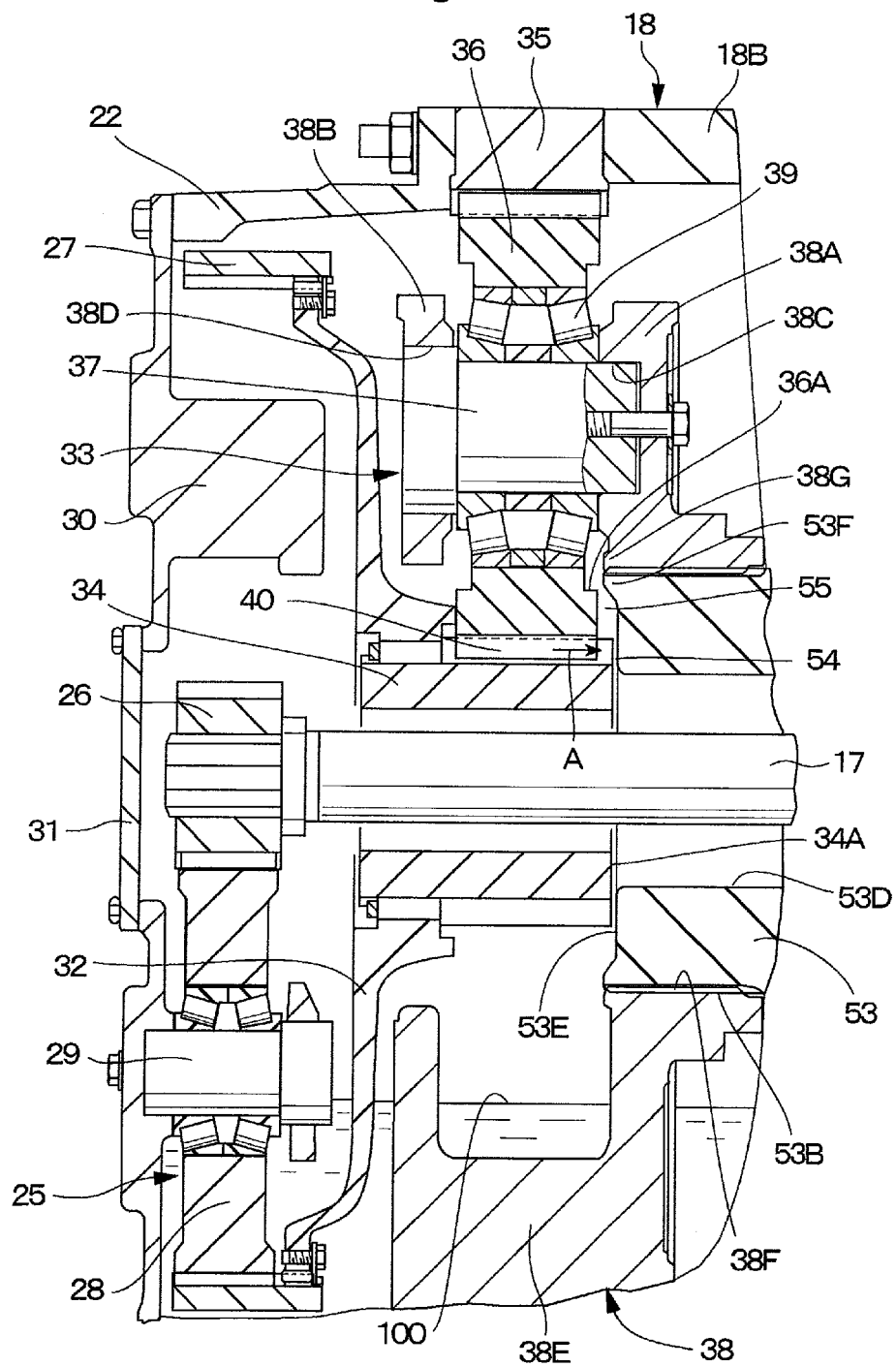
FIG. 5 is a further enlarged cross section showing an oil guide path provided among a sun gear, a planetary gear, and a cylindrical coupling member in FIG. 4.

As shown in FIG. 5, the sun gear 34 has an end surface 34A in the axial one-side projecting closer to a side of an opposing surface portion 53E to be described later than the planetary gear 36 to be arranged in a position close to the opposing surface portion 53E. Therefore, the lubricant oil 100 axially (for example, in the direction of an arrow A in FIG. 5) ejected from a meshing part 40 between the sun gear 34 and the planetary gear 36 does not escape to a side of a stepped hole 53D of the cylindrical coupling member 53, but is guided by the oil guide path 55 to be trapped or collected in the annular step portion 36A of the planetary gear 36.

On the other hand, the second-stage internal gear 35 is formed by using a ring gear to surround the sun gear 34 and the respective planetary gears 36 from a radial outside. The internal gear 35 is integrally fixed between the extending cylindrical portion 18B forming a part of the wheel mounting cylinder 18 and the outer drum 22 by using the long bolts 23. Further, internal teeth formed over the entire periphery on the inner peripheral side of the internal gear 35 are meshed with the respective planetary gears 36.

Figure 4:
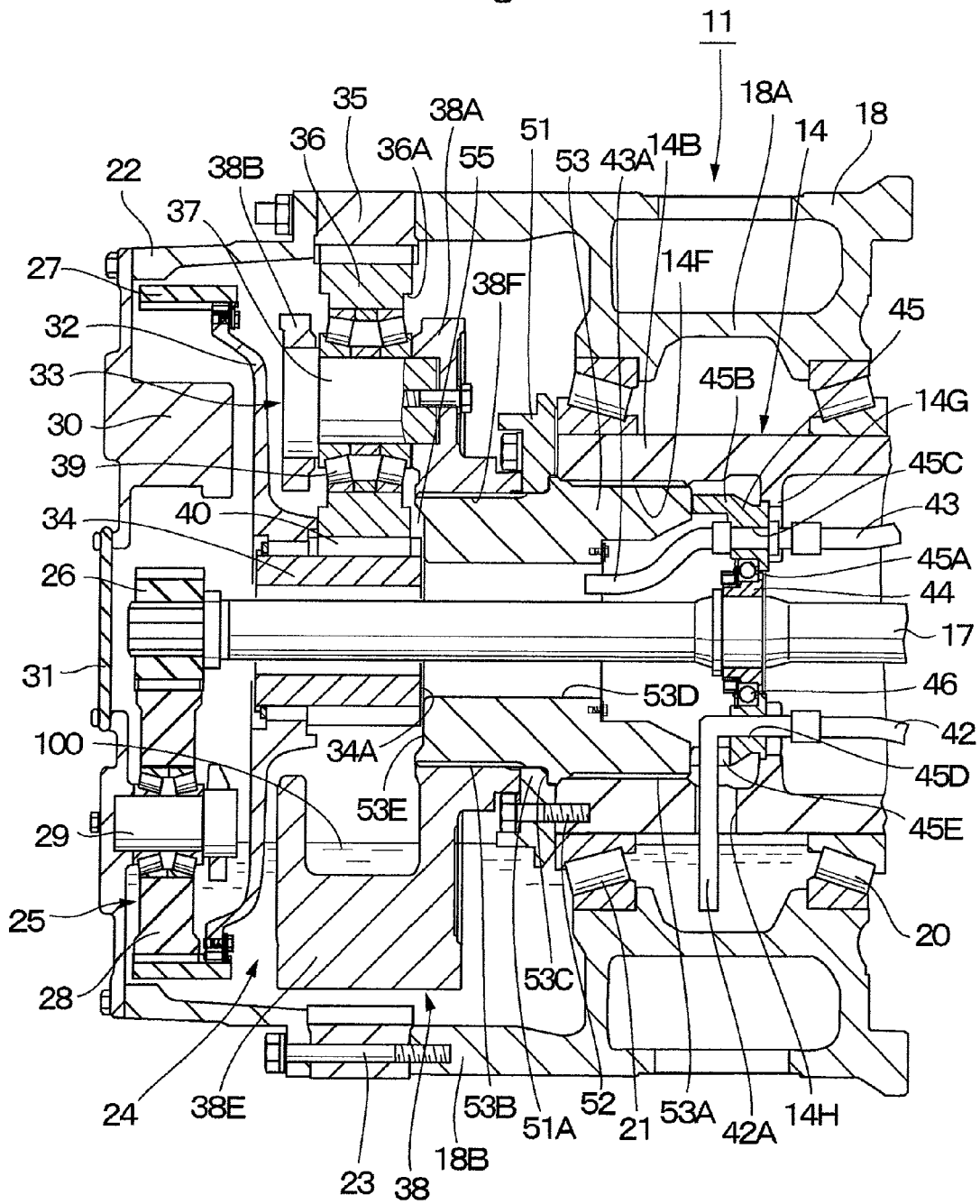
FIG. 4 is an enlarged cross section showing a planetary gear reduction mechanism, a wheel mounting cylinder and an open side of a spindle in FIG. 3.

As shown in FIG. 4 and FIG. 5, the second-stage carrier 38 as a final stage is configured by including annular support plates 38A and 38B, a plurality of pin mounting hole portions 38C and 38D (only one of each is shown in the figure), and a plurality (for example, three or four pieces) of connecting portions 38E. The annular support plates 38A and 38B are made up of two plate bodies each having a different plate thickness and are arranged to axially oppose with each other. The pin mounting hole portions 38C and 38D are arranged by constant intervals in the circumferential direction for arranging each of the planetary gears 36 between the support plates 38A and 38B. Both end sides of each support pin 37 are mounted to be fitted in the pin mounting hole portions 38C and 38D. The connecting portions 38E are arranged to be spaced in the circumferential direction from each pin mounting hole portion 38C and 38D to connect the annular support plates 38A and 38B integrally.

The female spline 38F is formed on an inner peripheral side of the support plate 38A in the carrier 38. The female spline 38F is spline-coupled to second male spline 53B of the cylindrical coupling member 53 to be described later. In the second male spline 53B, each tooth flank is subjected to a modification process (for example, crowning process). Thereby, a tooth contact in each tooth flank between the second male spline 53B and the female spline 38F can be made uniform over an entire tooth width.

The support plate 38A in the carrier 38 is provided with an annular projecting portion 38G in an inner peripheral side of an end surface as an axial other side (an end surface axially opposing the planetary gear bearing 39). The annular projecting portion 38G axially projects to a side of the annular step portion 36A of the planetary gear 36 in the same way with an annular projecting portion 53F of the cylindrical coupling member 53 to be described later. The female spline 38F in the carrier 38 is also formed in a position of the annular projecting portion 38G. Therefore, a tooth width (axial length) of the female spline 38F is longer by an axial projection dimension of the annular projecting portion 38G. The annular projecting portions 38G and 53F can function as steps for temporarily reserving the oil liquid in the substantially same way with the annular step portion 36A in the planetary gear 36 to temporarily trap the lubricant oil 100 to be described later.

Here, in regard to the second-stage planetary gear reduction mechanism 33, the carrier 38 is spline-coupled through the cylindrical coupling member 53 to be described later to the circular cylindrical portion 14B of the spindle 14, thereby restraining revolving movements of the respective planetary gears 36 (rotation of the carrier 38). Therefore, as the sun gear 34 rotates integrally with the coupling 32, the second-stage planetary gear reduction mechanism 33 converts the rotation of the sun gear 34 into rotation of each of the planetary gears 36. The rotation of each of the planetary gears 36 is transmitted to the second-stage internal gear 35, and the internal gear 35 is decelerated for rotation. Therefore, the rotational torque of large output decelerated at the two-stage through the first and second-stage planetary gear reduction mechanisms 25 and 33 is transmitted to the wheel mounting cylinder 18 to which the internal gear 35 is fixed.

Next, a lubricating system for lubricating the reduction gear mechanism 24 will be explained. The lubricating system is constituted by including a partition wall 41, the suction pipe 42, a supply pipe 43, an inner retainer 44, the bearing retainer 45, and the rotational shaft bearing 46.

Here, the lubricant oil 100 is accommodated in a bottom side of the wheel mounting cylinder 18 in a state of being reserved therein, and the respective planetary gear reduction mechanisms 25 and 33 operate in a state where the lubricant oil 100 is supplied all the time. In this case, an oil surface of the lubricant oil 100 is lower than, for example, the lowest section of the circular cylindrical portion 14B forming the spindle 14 and is set in a position where a lower side section of each of the wheel support bearings 20 and 21 is immersed. In consequence, at the operating of the travel drive device 11, the lubricant oil 100 can be stirred by the wheel mounting cylinder 18 and the respective planetary gear reduction mechanisms 25 and 33 to perform a so-called stirring lubrication, and a stirring resistance of the lubricant oil 100 can be restricted to be small.

The partition wall 41 is provided in the spindle 14. The partition wall 41 is formed of an annular plate and is removably fixed at its outer peripheral side to an inner peripheral side of the large-diameter cylindrical portion 14A of the spindle 14 by using bolts. Here, the partition wall 41 is configured to divide an inside of the spindle 14 into a motor accommodating space portion 41A positioned at its axial one side for accommodating the wheel drive motor 16 and a cylindrical space portion 41B positioned at its axial other side for communicating with the inside of the wheel mounting cylinder 18 all the time.

The suction pipe 42 collects the lubricant oil 100 reserved in the wheel mounting cylinder 18 and the suction pipe 42 has one side in the length direction axially extending within the cylindrical body 13 of the axle housing 12 to be connected to a suction side of a lubricating pump (not shown). An intermediate section of the suction pipe 42 in the length direction axially extends within the spindle 14 toward the side of the wheel mounting cylinder 18. A tip end side 42A (the other side in the length direction) of the suction pipe 42 is bent in an L-letter shape downward from a lower side of the rotational shaft 17 to penetrate through the radial hole 14H of the spindle 14. Therefore, the suction pipe 42 is immersed at the tip end side 42A in the lubricant oil 100 in the wheel mounting cylinder 18 to collect the lubricant oil 100 to the side of the lubricating pump.

The supply pipe 43 supplies lubricant oil 100 into the reduction gear mechanism 24. The supply pipe 43 is located above the suction pipe 42 and the rotational shaft 17 in the spindle 14, a tip end side 43A of which is inserted into the cylindrical coupling member 53 to be described later. One side (base end side) in the length direction of the supply pipe 43 is connected to a discharge side of the lubricating pump. The lubricant oil 100 discharged from the lubricating pump is supplied from a tip end side 43A (the other side in the length direction) of the supply pipe 43 toward the cylindrical coupling member 53 to be described later, that is, toward the planetary gear reduction mechanisms 25 and 33.

The lubricant oil 100 reserved in a bottom side of the wheel mounting cylinder 18 is suctioned from a tip end side 42A of the suction pipe 42 by driving the lubricating pump, and the lubricant oil 100 suctioned by the lubricating pump is cooled by an oil cooler (not shown). The cooled lubricant oil 100 is thereafter supplied through the supply pipe 43 to the planetary gear reduction mechanisms 25 and 33, thus lubricating the planetary gear reduction mechanisms 25 and 33.

Denoted at 44 is the inner retainer provided to fit into an axial intermediate section of the rotational shaft 17, and denoted at 45 is an outer bearing retainer located at the outer peripheral side of the inner retainer 44 through the rotational shaft bearing 46. Here, the inner retainer 44 is press-fitted at its inner peripheral side into the intermediate section of the rotational shaft 17 to rotate integrally with the rotational shaft 17. The outer bearing retainer 45 is fixed to an inward projecting portion 14G of the spindle 14 by using a plurality of bolts (not shown).

The bearing retainer 45 is formed as an annular ring body. An outer race mounting portion 45A is mounted on an inner peripheral side of the bearing retainer 45 in a state of preventing the outer race of the rotational shaft bearing 46 from pulling out of the bearing retainer 45. A cylindrical projecting portion 45B is provided on an outer peripheral side of the bearing retainer 45 to project toward an end surface of the cylindrical coupling member 53 to be described later at an axial one side. The cylindrical projecting portion 45B forms a positioning projection for axially positioning the cylindrical coupling member 53 inside the circular cylindrical portion 14B of the spindle 14.

The bearing retainer 45 is provided with insert holes 45C and 45D positioned to radially (upper and lower directions in FIG. 4) oppose with each other. The supply pipe 43 is mounted to penetrate through the insert hole 45C. The suction pipe 42 is mounted to penetrate through the insert hole 45D. The bearing retainer 45 is provided with a radial notched portion 45E in a position under the insert hole 45D. The suction pipe 42 is inserted through the notched portion 45E into the radial hole 14H of the spindle 14.

That is, as shown in FIG. 3 and in FIG. 4, mid-sections of the suction pipe 42 and the supply pipe 43 extend to axially penetrate through the bearing retainer 45, so that the suction pipe 42 and the supply pipe 43 are positioned in the spindle 14 through the bearing retainer 45. A plurality of bolt through holes (not shown) are formed in the bearing retainer 45. The bearing retainer 45 is fixed to the inward projecting portion 14G of the spindle 14 by a plurality of bolts inserted into the bolt through holes.

The rotational shaft bearing 46 is located between the inner retainer 44 in the side of the rotational shaft 17 and the bearing retainer 45 in the side of the spindle 14. The rotational shaft bearing 46 rotatably supports the axial intermediate section of the rotational shaft 17 through the inner retainer 44 and the outer bearing retainer 45 in the circular cylindrical portion 14B of the spindle 14. Therefore, the core swing in the axial intermediate section of the long rotational shaft 17 can be suppressed, and the long rotational shaft 17 can transmit stable rotation of the rotational shaft 17 to the first-stage sun gear 26.

A wet brake 47 applies braking forces to rotation of the wheel mounting cylinder 18, and the wet brake 47 is constituted by a hydraulic brake of a wet multi-plate type. The wet brake 47 is provided through a brake hub 48 to be described later between the spindle 14 in the axle housing 12 and the wheel mounting cylinder 18. The wet brake 47 applies braking forces to the brake hub 48 rotating together with the wheel mounting cylinder 18.

The brake hub 48 forms apart of the wet brake 47 and rotates together with the wheel mounting cylinder 18. The brake hub 48 is formed as a cylindrical body axially extending between the spindle 14 and the wet brake 47. The axial other side of the brake hub 48 is removably fixed to the hollow cylindrical portion 18A of the wheel mounting cylinder 18 by a plurality of bolts 49.

The one-side retainer 50 positions an inner race of the wheel support bearing 20 to the circular cylindrical portion 14B of the spindle 14. As shown in FIG. 3, the one-side retainer 50 is provided to be fitted into the outer peripheral surface of the circular cylindrical portion 14B. An axial one side of the one-side retainer 50 abuts against the annular step portion 14D of the spindle 14. Meanwhile, an axial other side of the one-side retainer 50 axially abuts against the inner race of the wheel support bearing 20. Therefore, in regard to the wheel support bearing 20, the outer race is axially positioned by the hollow cylindrical portion 18A of the wheel mounting cylinder 18 and the inner race is axially positioned by the one-side retainer 50.

The end retainer 51 is mounted to an end opening side of the spindle 14 through a plurality of bolts 52 and forms the other-side retainer. The end retainer 51 is fixed to the circular cylindrical portion 14B of the spindle 14 and axially positions the inner race of the wheel support bearing 21 with the outer peripheral side of the circular cylindrical portion 14B. That is, in regard to the wheel support bearing 21, the outer race is axially positioned by the hollow cylindrical portion 18A of the wheel mounting cylinder 18 and the inner race is axially positioned by the end retainer 51. Thereby, the wheel mounting cylinder 18 is rotatably supported by the wheel support bearings 20 and 21 in a state of being positioned between the one-side retainer 50 and the end retainer 51.

The end retainer 51 is formed as an annular ring body. An inner peripheral side of the end retainer 51 is provided with a retaining portion 51A projecting inward in a radial direction in such a manner as to abut against a step portion 53C of the cylindrical coupling member 53 to be described later. The retaining portion 51A makes surface contact with the annular step portion 53C over the entire circumference for performing an operation of retaining the cylindrical coupling member 53 at the open side of the spindle 14. Here, a plurality of bolt through holes are bored in the end retainer 51. The end retainer 51 is fixed to the circular cylindrical portion 14B of the spindle 14 by the plurality of bolts 52 inserted into the bolt through holes.

Next, the cylindrical coupling member 53 used in the first embodiment will be explained.

Namely, the cylindrical coupling member 53 is removably provided between the open side of the spindle 14 and the carrier 38. The cylindrical coupling member 53 is formed as a stepped cylindrical body formed of a single, separate member independently of the spindle 14 and the carrier 38, and the rotational shaft 17 is inserted with a gap in the inner peripheral side of the cylindrical coupling member 53. In regard to the cylindrical coupling member 53, an outer periphery thereof at one side in an axial direction is spline-coupled to the open end inner peripheral side of the spindle 14 and an outer periphery thereof at the other side in the axial direction is spline-coupled to the inner peripheral side of the carrier 38.

The first male spline 53A positioned in an axial one side and spline-coupled to the female spline 14F of the spindle 14, the second male spline 53B positioned in an axial other side and formed in a diameter smaller than the first male spline 53A to be spline-coupled to the female spline 38F of the carrier 38, and the annular step portion 53C positioned between the first and second male splines 53A and 53B and formed over an entire circumference, are provided on the outer peripheral side of the cylindrical coupling member 53.

A stepped hole 53D is provided on an inner peripheral side of the cylindrical coupling member 53 to have a large diameter at an axial one side and a small diameter at the axial other side. The rotational shaft 17 and a tip end side 43A of the supply pipe 43 are inserted into the stepped hole 53D. The cylindrical coupling member 53 is arranged in a position all the time higher than a liquid surface level of the lubricant oil 100 accommodated in the wheel mounting cylinder 18.

An end surface of the cylindrical coupling member 53 at an axial other side forms the opposing surface portion 53E opposing the meshing part 40 between the sun gear 34 and each of the planetary gears 36 through the gap 54 to be described later. The opposing surface portion 53E in the cylindrical coupling member 53 is provided with the annular projecting portion 53F positioned in an outer diameter side thereof to axially project to a side of the annular step portion 36A of the planetary gear 36. The second male spline 53B is also formed in a position of the annular projecting portion 53F. Thereby, the second male spline 53B is longer in a tooth width (axial length) by an axial projection dimension of the annular projecting portion 53F. The female spline 38F in the carrier 38 is also provided with the similar annular projecting portion 38G on the end surface of the support plate 38A.

Denoted at 54 is the axial gap formed between the opposing surface portion 53E of the cylindrical coupling member 53 and the end surface 34A of the sun gear 34 at one side, and the gap 54 is formed to be narrower as compared to the oil guide path 55 to be described later. That is, the gap 54 forms a dam in such a manner that the lubricant oil 100 ejected from the meshing part 40 between the sun gear 34 and each of the planetary gears 36 flows toward the oil guide path 55, and prevents the lubricant oil 100 from escaping toward a side of the stepped hole 53D of the cylindrical coupling member 53 (toward a radial inside of the sun gear 34).

Denoted at 55 is the oil guide path adopted in the first embodiment, and is formed between a one-side end surface of each of the planetary gears 36 and the opposing surface portion 53E of the cylindrical coupling member 53. The oil guide path 55 guides the lubricant oil ejected in the direction of an arrow A (refer to FIG. 5) from the meshing part 40 between the sun gear 34 and each of the planetary gears 36, to the planetary gear bearing 39 between the planetary gear 36 and the support pin 37, thus maintaining the planetary gear bearing 39 to be in an oil supplied state. The oil guide path 55 is constituted by including the annular step portion 36A of the planetary gear 36, the annular projecting portion 38G of the carrier 38, and the opposing surface portion 53E and the annular projecting portion 53F of the cylindrical coupling member 53.

The travel drive device 11 for the dump truck 1 according to the first embodiment has the aforementioned configuration, and next, an operation thereof will be explained.

When an operator who gets in the cab 5 of the dump truck 1 activates the engine 8, the hydraulic pump as a hydraulic source is driven and rotated, and electric power is generated by a power generator (any thereof is not shown). At the time the dump truck 1 is driven to travel, the electric power is supplied from the power generator to the wheel drive motor 16, and thereby the wheel drive motor 16 is activated to rotate the rotational shaft 17.

The rotation of the rotational shaft 17 is transmitted from the sun gear 26 of the first-stage planetary gear reduction mechanism 25 to the respective planetary gears 28 in a state of being decelerated, and the rotation of each of the planetary gears 28 is transmitted through the internal gear 27 and the coupling 32 to the sun gear 34 of the second-stage planetary gear reduction mechanism 33 in a state of being decelerated. In regard to the second-stage planetary gear reduction mechanism 33, the rotation of the sun gear 34 is transmitted to the respective planetary gears 36 in a state of being decelerated. At this time, since the carrier 38 supporting the respective planetary gears 36 is spline-coupled to the circular cylindrical portion 14B of the spindle 14 by using the separated cylindrical coupling member 53, the revolving movements of the respective planetary gears 36 (rotation of the carrier 38) are restricted.

As a result, each of the planetary gears 36 only rotates around the sun gear 34, and rotation decelerated by the rotation of each of the planetary gears 36 is transmitted to the internal gear 35 fixed to the wheel mounting cylinder 18. Thereby, the wheel mounting cylinder 18 rotates with the rotational torque of large output decelerated by the two-stage through the first and second-stage planetary gear reduction mechanisms 25 and 33. In consequence, the left and right rear wheels 7 as the drive wheel can be rotated together with the wheel mounting cylinder 18 to drive the dump truck 1 for traveling.

The rotational shaft 17 axially extending from the spindle 14 toward an inside of the wheel mounting cylinder 18 has an axial intermediate section rotatably supported through the rotational shaft bearing 46 by the inner retainer 44 and the outer bearing retainer 45. Therefore, when the rotational shaft 17 rotates in high speeds, the radial torsion or the core swing of the axial intermediate section to be generated due to eccentricity of the rotational shaft 17 can be suppressed at the position of the rotational shaft bearing 46 to enhance durability of the rotational shaft 17.

At the operation of the travel drive device 11, the lubricant oil 100 reserved in the wheel mounting cylinder 18 is stirred upwards in order by rotation of the wheel mounting cylinder 18, the respective planetary gears 28 and 36 in the first and second-stage planetary gear reduction mechanisms 25 and 33. Therefore, the lubricant oil 100 is supplied to meshing sections of the respective gears, the wheel support bearings 20 and 21 between the circular cylindrical portion 14B of the spindle 14 and the wheel mounting cylinder 18. At this time, in the second planetary gear reduction mechanism 33, the lubricant oil 100 is supplied also to the meshing part 40 between the sun gear 34 and each of the planetary gears 36 (refer to FIG. 4 and FIG. 5). Thereafter, the lubricant oil 100 drops downwards and is reserved in the bottom side of the wheel mounting cylinder 18.

The lubricant oil 100 accommodated in the bottom side of the wheel mounting cylinder 18 is suctioned up from the tip end side 42A of the suction pipe 42 by the lubricating pump. The lubricant oil 100 is cooled by an oil cooler, and subsequently, is discharged to the side of the supply pipe 43. Therefore, the lubricant oil 100 can be sequentially supplied from the tip end side 43A of the supply pipe 43 toward the reduction gear mechanism 24 (namely, the first and second-stage planetary gear reduction mechanisms 25 and 33) in the wheel mounting cylinder 18.

On the other hand, in a case of decelerating a traveling speed of the dump truck 1 in the middle of the traveling, in some cases the dump truck 1 cannot be sufficiently decelerated simply by decelerating rotation of the wheel drive motor 16. In such a case, an operator of the dump truck 1 depresses the brake pedal to supply a brake pressure (pressurized oil) to the wet brake 47 composed of a hydraulic brake of a wet multi-plate type. Thereby, the wet brake 47 can apply braking forces to the brake hub 48 rotating integrally with the wheel mounting cylinder 18.

Incidentally, the travel drive device 11 for the dump truck 1 is structured such that the carrier 38 used for the final-stage planetary gear reduction mechanism 33 is mounted in a non-rotating state on the open end side of the spindle 14, and therefore the carrier 38 and the spindle 14 are coupled by a spline-coupling portion. However, this spline-coupling portion used in the conventional art does not necessarily have sufficient strength in a case where a loading weight of the dump truck 1 is increased to, for example, 250 tons or more, and a further improvement on the coupling portion is needed.

In addition, since rotation of the carrier 38 is restrained by the spindle 14 in the final-stage planetary gear reduction mechanism 33. Thereby, at least a part of a plurality of planetary gears 36 (for example, two or more planetary gears 36) supported by the carrier 38 repeats the rotation in a state of being exposed upward from a liquid surface of the lubricant oil 100. Therefore, there are some cases where a sufficient amount of the lubricant oil can not be necessarily supplied to the support pin 37 and the planetary gear bearing 39 rotatably (rotatably on its axis) supporting the planetary gear 36, creating a problem with possible occurrence of lubrication lack.

Therefore, according to the first embodiment, the cylindrical coupling member 53, which is formed as an independent, single coupling member, is provided between the open side of the spindle 14 and the carrier 38, wherein the spindle 14 and the carrier 38 are spline-coupled by the cylindrical coupling member 53. Further, the oil guide path 55 is formed between a one-side end surface of each of the planetary gears 36 and the opposing surface portion 53E of the cylindrical coupling member 53. The oil guide path 55 guides the lubricant oil ejected in the direction of an arrow A (refer to FIG. 5) from the meshing part 40 between the sun gear 34 and each of the planetary gears 36, to the planetary gear bearing 39 between the planetary gear 36 and the support pin 37.

The oil guide path 55 is constituted by including the annular step portion 36A formed in the radial intermediate section of the planetary gear 36, the annular projecting portion 38G of the carrier 38, and the opposing surface portion 53E and the annular projecting portion 53F of the cylindrical coupling member 53. On the other hand, the narrow gap 54 is formed between the opposing surface portion 53E of the cylindrical coupling member 53 and the sun gear 34, and the gap 54 forms a dam in such a manner that the lubricant oil 100 ejected from the meshing part 40 flows toward the oil guide path 55.

The cylindrical coupling member 53 is formed as a stepped cylindrical body by a single member, an axial one side thereof is positioned by the cylindrical projecting portion 45B of the bearing retainer 45, and an axial other side thereof is positioned through the annular step portion 53C by the end retainer 51. On the other hand, the cylindrical coupling member 53 is supported in a non-rotating state such that the first male spline 53A is spline-coupled to the female spline 14F of the spindle 14 and the second male spline 53B is spline-coupled to the female spline 38F of the carrier 38.

In the first embodiment, by configuring the cylindrical coupling member 53 in this manner, it is not required to integrally provide the cylindrical projecting portion having the male spline on the outer peripheral side, which is different from the carrier used in the conventional art, and therefore it is possible to simplify the shape of the carrier 38. In addition, since the cylindrical coupling member 53 is a member separated from the spindle 14 and the carrier 38, the cylindrical coupling member 53 can be formed in a simple shape. Therefore, when the male splines 53A and 53B are molded on the outer peripheral side of the cylindrical coupling member 53, a hob cutter process can be adopted. Further, in regard to the male splines 53A and 53B, it is easy to execute the modification process to the tooth flank called crowning or relieving for preventing partial contact in the tooth flank.

On the other hand, the bearing retainer 45 supports the outer race of the rotational shaft bearing 46 on the inner peripheral side of the spindle 14, but is provided with a cylindrical projecting portion 45B projecting toward an end surface of the cylindrical coupling member 53 at an axial one side. The cylindrical projecting portion 45B abuts against the end surface of the cylindrical coupling member 53, and thereby the cylindrical coupling member 53 can be axially positioned in the spindle 14.

As a result, the cylindrical coupling member 53 is structured such that the end surface at the axial one side (side of the first male spline 53A) abuts against the cylindrical projecting portion 45B of the bearing retainer 45 and the annular step portion 53C at the axial intermediate section abuts against the retaining portion 51A of the end retainer 51. In consequence, the cylindrical coupling member 53 can be sandwiched from the axial both sides between the cylindrical projecting portion 45B and the retaining portion 51A. Therefore, the cylindrical coupling member 53 is accurately positioned in a state where the axial intermediate section is stable to an open end of the spindle 14.

On the other hand, in regard to the planetary gear reduction mechanism 33, the rotation of the carrier 38 is restrained by the spindle 14, and thereby the planetary gear 36 repeatedly performs only the rotation without performing the revolving movement. However, the lubricant oil ejected in the direction of an arrow A (refer to FIG. 5) from the meshing part 40 between the sun gear 34 and the planetary gear 36 can be guided through the aforementioned oil guide path 55 to the support pin 37 and the planetary gear bearing 39. Therefore, the lubricating state can be maintained in the planetary gear bearing 39 between the planetary gear 36 and the support pin 37 to enhance the durability and the reliability of the entire travel drive device 11.

In this case, the cylindrical coupling member 53 has the opposing surface portion 53E opposing the meshing part 40 between the sun gear 34 and each of the planetary gears 36 through the axial gap 54. Therefore, the gap 54 dams the lubricant oil ejected from the meshing part 40 between the sun gear 34 and each of the planetary gears 36, and traps the lubricant oil in such a manner as to flow toward the oil guide path 55. Therefore, the lubricant oil can be guided between the planetary gear 36 and the support pin 37. Accordingly, the planetary gear bearing 39 can be maintained in a lubricating state.

Particularly, the one-side end surface 34A of the sun gear 34 in the planetary gear reduction mechanism 33 projects closer to the axial one side of the cylindrical coupling member 53 than the end surface of each of the planetary gears 36 to be close to the opposing surface portion 53E of the cylindrical coupling member 53, that is, to narrow the gap 54. Therefore, the gap 54 guides the lubricant oil ejected in the direction of an arrow A (refer to FIG. 5) from the meshing part 40 between the sun gear 34 and each of the planetary gears 36 to the oil guide path 55, and the oil guide path 55 can supply the lubricant oil to the planetary gear bearing 39 between the planetary gear 36 and the support pin 37.

In consequence, even in a case where ejection of the lubricant oil from the meshing part 40 between the sun gear 34 and each of the planetary gears 36 cannot be sufficiently obtained because of an influence of a traveling speed of the dump truck 1, an inclination of the vehicle body 2 or the like, the planetary gear 36 can be maintained to be in a lubricating state. As a result, the lubricant oil 100 attached on the tooth flank of the sun gear 34 projecting from each of the planetary gears 36 can be splashed to the planetary gear 36 by a function of a centrifugal force generated by rotation of the sun gear 34 to stably maintain the planetary gear 36 to be in a lubricating state without any influence of the travelling speed of the dump truck 1, the inclination of the vehicle body 2 or the like.

Further, the annular step portion 36A provided in the radial intermediate section of each of the planetary gears 36 can trap the lubricant oil ejected from the meshing part 40 between the sun gear 34 and each of the planetary gears 36 through the opposing surface portion 53E and the annular projecting portion 53F of the cylindrical coupling member 53, and can guide the trapped lubricant oil to the planetary gear bearing 39 with rotation (rotation on its axis) of the planetary gear 36.

Therefore, according to the first embodiment, the lubricant oil is guided between the planetary gear 36 performing repetition of only rotation without performing the revolving movement and the support pin 37 in the planetary gear reduction mechanism 33, and thereby the planetary gear bearing 39 between the planetary gear 36 and the support pin 37 can be maintained in a lubricating state to enhance durability and reliability of the entire travel drive device 11. In addition, by providing the cylindrical coupling member 53 as a separate coupling member between the open end side of the spindle 14 and the carrier 38, the strength to the rotational load can be increased to enhance durability and lifetime of the entire device.

Figure 6:
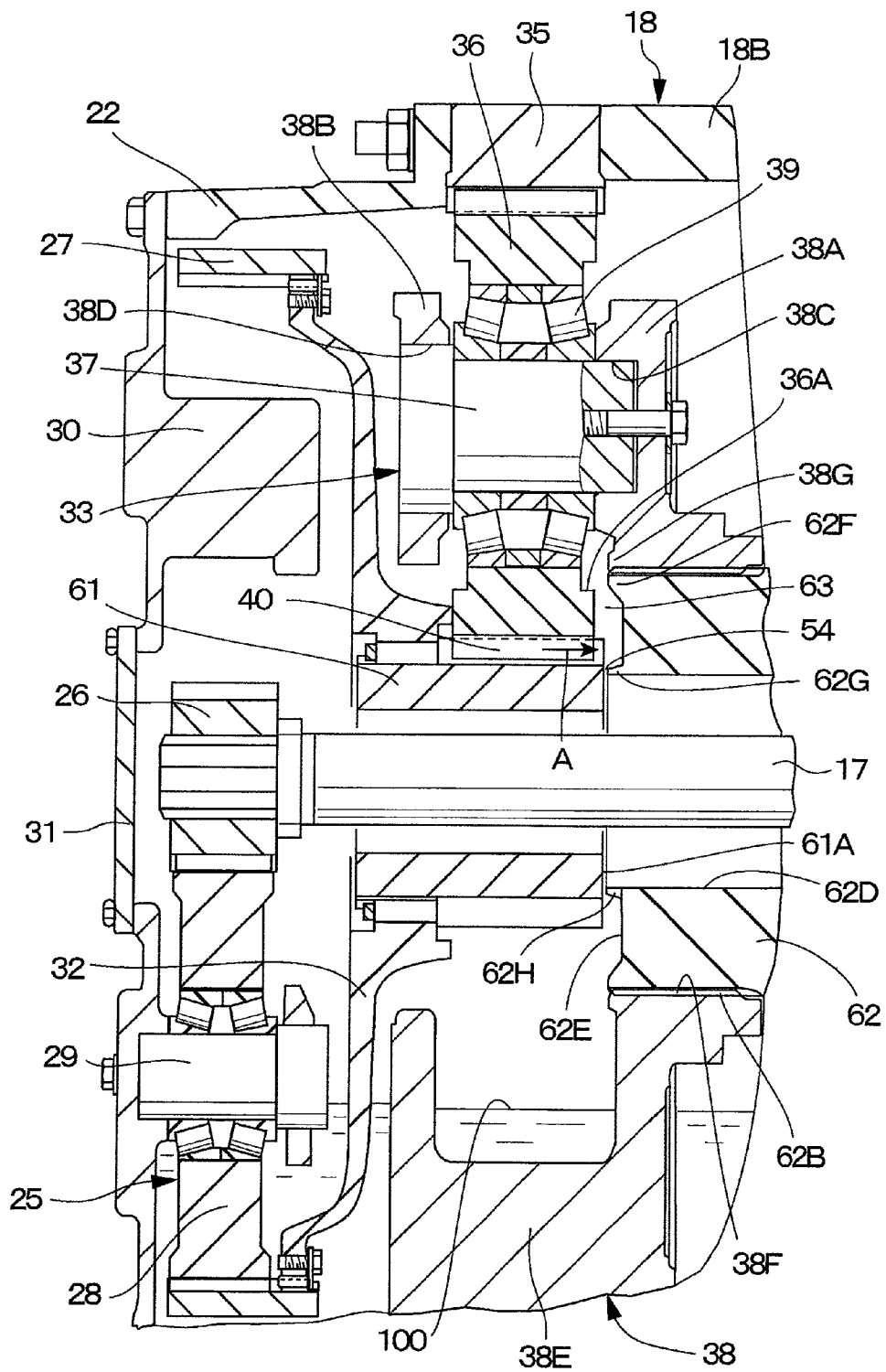
FIG. 6 is a further enlarged cross section showing an oil guide path provided among a sun gear, a planetary gear, and a cylindrical coupling member according to a second embodiment.

Next, FIG. 6 shows a second embodiment according to the present invention. The present embodiment comprises a guide projection provided in an opposing surface of a cylindrical coupling member for beating off lubricant oil to a radial outside. It should be noted that in the second embodiment, the component elements that are identical to those of the foregoing first embodiment will be simply denoted by the same reference numerals to avoid repetitions of similar explanations.

In the figure, denoted at 61 is a sun gear adopted in the second embodiment, and the sun gear 61 is configured substantially in the same way with the sun gear 34 described in the first embodiment. An axial one-side end surface 61A of the sun gear 61 projects closer to an opposing surface portion 62E to be described later than the planetary gear 36. However, in regard to the sun gear 61 in this case, the projection dimension is made smaller than that of the sun gear 34 described in the first embodiment. That is, since a guide projection 62G is provided in a cylindrical coupling member 62 to be described later, an axial entire length dimension (projection dimension) of the sun gear 61 is formed smaller by the projection dimension of the guide projection 62G.

Denoted at 62 is the cylindrical coupling member removably provided between the open side of the spindle 14 and the carrier 38. The cylindrical coupling member 62 is configured substantially in the same way with the cylindrical coupling member 53 described in the first embodiment, and includes first male spline (not shown), second male spline 62B, an annular step portion (not shown), a stepped hole 62D, the opposing surface portion 62E, and an annular projecting portion 62F. Namely, the opposing surface portion 62E of the cylindrical coupling member 62 opposes the meshing part 40 between the sun gear 61 and each of the planetary gears 36 through the axial gap 54, and the annular projecting portion 62F axially projecting toward a side of the annular step portion 36A of the planetary gear 36 is provided in the outer diameter side of the opposing surface portion 62E.

However, the cylindrical coupling member 62 in this case differs from the first embodiment in a point where the guide projection 62G which projects toward an axial one-side end surface 61A of the sun gear 61 is formed in an inner diameter side of the opposing surface portion 62E. The guide projection 62G is configured of an annular projection extending over an entire circumference along the stepped hole 62D of the cylindrical coupling member 62, and is arranged in a position slightly closer to a radial inside than the meshing part 40 between the sun gear 61 and each of the planetary gears 36. The guide projection 62G beats off a part of the lubricant oil ejected in the direction of an arrow A (refer to FIG. 6) from the meshing part 40 between the sun gear 61 and each of the planetary gears 36 toward a radial outside, and causes the annular step portion 36A of the planetary gear 36 to trap and collect the beat lubricant oil, for example.

Further, the guide projection 62G extending over an entire circumference of the cylindrical coupling member 62 is provided with one or more notches 62H formed in a position lower than the rotational shaft 17, for example. The notch 62H flows lubricant oil flown into the stepped hole 62D out of the lubricant oil ejected in the direction of an arrow A (refer to FIG. 6) from the meshing part 40 between the sun gear 61 and each of the planetary gears 36, downwards from an inside of the cylindrical coupling member 62 for discharge.

Denoted at 63 is an oil guide path adopted in the second embodiment, and is formed between a one-side end surface of each of the planetary gears 36 and the opposing surface portion 62E of the cylindrical coupling member 62 in the same way with the oil guide path 55 described in the first embodiment. The oil guide path 63 guides the lubricant oil ejected in the direction of an arrow A (refer to FIG. 6) from the meshing part 40 between the sun gear 61 and each of the planetary gears 36 to the planetary gear bearing 39 between the planetary gear 36 and the support pin 37, maintaining the planetary gear bearing 39 to be in an oil supplied state. The oil guide path 63 is constituted by the annular step portion 36A of the planetary gear 36, the annular projecting portion 38G of the carrier 38, and the opposing surface portion 62E, the annular projecting portion 62F and the guide projection 62G of the cylindrical coupling member 62 and the like.

In this manner, even in the second embodiment thus configured, the oil guide path 63 can guide the lubricant oil axially ejected from the meshing part 40 between the sun gear 61 and each of the planetary gears 36 to the planetary gear bearing 39 between the planetary gear 36 and the support pin 37. Therefore, the second embodiment can obtain the operational effect substantially similar to that of the first embodiment.

Particularly, in the second embodiment, the guide projection 62G which projects toward the axial one-side end surface 61A of the sun gear 61 is provided in the inner diameter side of the opposing surface portion 62E in the cylindrical coupling member 62. Therefore, the guide projection 62G beats off a part of the lubricant oil ejected from the meshing part 40 between the sun gear 61 and each of the planetary gears 36 toward a radial outside, and for example, causes the annular step portion 36A of the planetary gear 36 to trap and collect the beat lubricant oil, which can be supplied to a side of the planetary gear bearing 39.

It should be noted that in the aforementioned second embodiment, an explanation is made by taking a case where the guide projection 62G is configured of the annular projection extending over an entire circumference along the stepped hole 62D of the cylindrical coupling member 62, as an example. However, the present invention is not limited thereto, but the guide projection may be provided only in the corresponding position in the meshing part 40 between the sun gear 61 and each of the planetary gears 36. That is, in a case where three or four planetary gears 36 are provided, three or four guide projections may be provided corresponding thereto.

Figure 7:
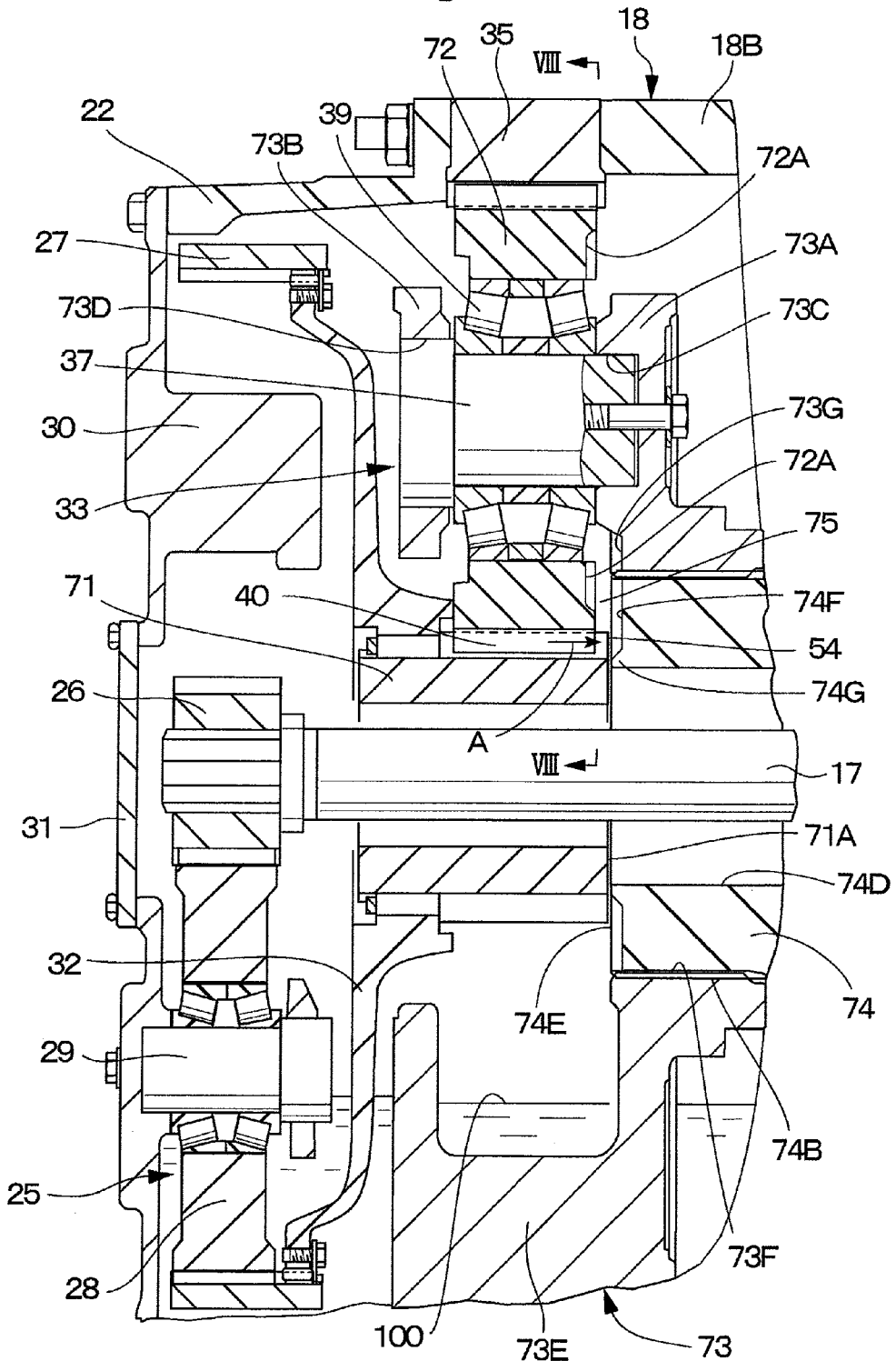
FIG. 7 is a further enlarged cross section showing an oil guide path provided among a sun gear, a planetary gear, and a cylindrical coupling member according to a third embodiment.
Figure 8:
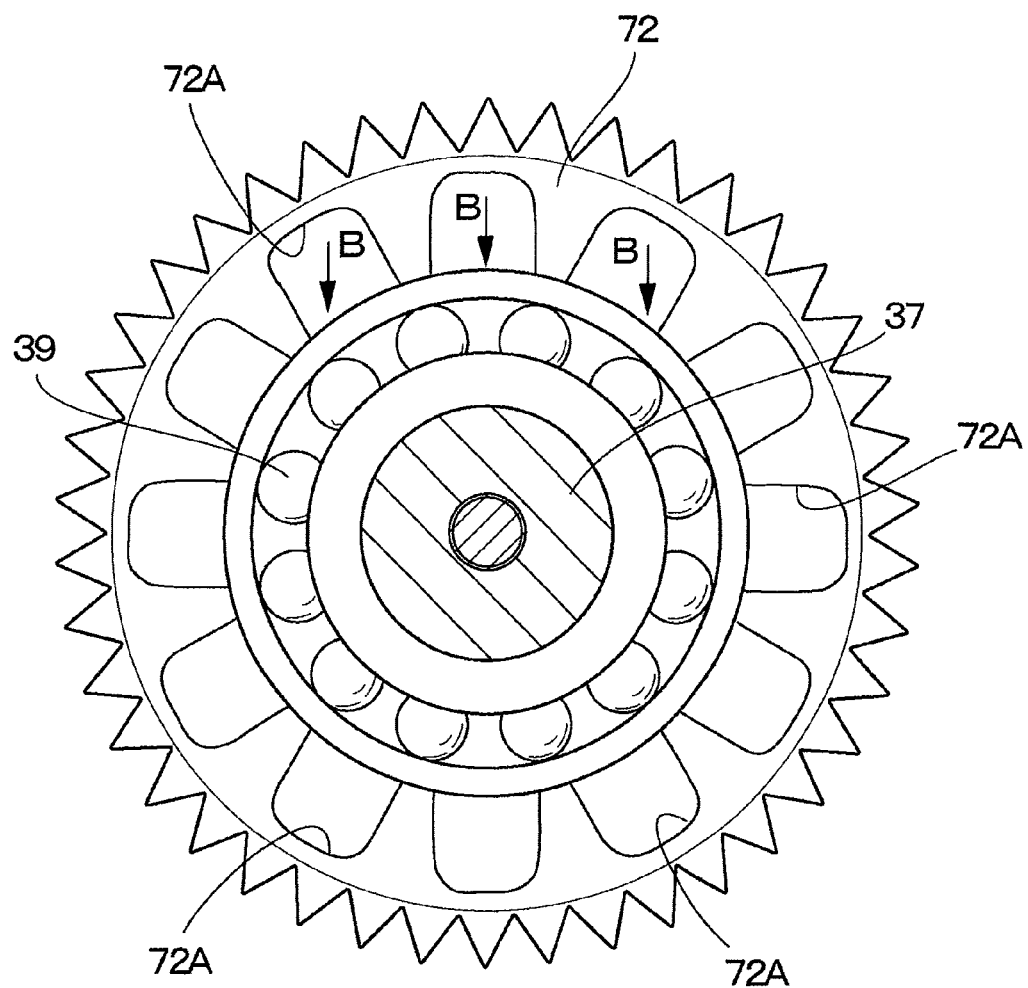
FIG. 8 is an enlarged cross section showing the planetary gear, a support pin, and a planetary gear bearing as viewed in the direction of arrows VIII-VIII in FIG. 7.

Next, FIG. 7 and FIG. 8 show a third embodiment according to the present invention. The present embodiment comprises a plurality of oil reservoirs formed respectively in end surfaces opposing with each other between a plurality of planetary gears and a cylindrical coupling member, wherein apart of the oil guide path is configured of these oil reservoirs. It should be noted that in the third embodiment, the component elements that are identical to those of the foregoing first embodiment will be simply denoted by the same reference numerals to avoid repetitions of similar explanations.

In the figure, denoted at 71 is a sun gear adopted in the third embodiment, and the sun gear 71 is configured substantially in the same way with the sun gear 34 described in the first embodiment. An axial one-side end surface 71A of the sun gear 71 projects closer to a side of an opposing surface portion 74E to be described later than a planetary gear 72 to be described later. However, in regard to the sun gear 71 in this case, the projection dimension (an axial, entire length dimension) is made smaller than that of the sun gear 34 described in the first embodiment.

Denoted at 72 is a plurality of the planetary gears adopted in the third embodiment, and each of the planetary gears 72 is configured substantially in the same way with the planetary gear 36 described in the first embodiment and meshes with the sun gear 71 in a position of the meshing part 40. However, the planetary gear 72 in this case is provided with a plurality of oil reservoirs 72A formed in an axial one-side end surface axially opposing the opposing surface portion 74E to be described later. As shown in FIG. 8, each of the oil reservoirs 72A radially extends from an inner diameter side to an outer diameter side of the planetary gear 72 and is configured of a U-letter-shaped recessed groove.

The lubricant oil is temporarily reserved in these oil reservoirs 72A as described later. The lubricant oil drops down in the direction of an arrow B in FIG. 8 by a gravity function and is supplied to the planetary gear bearing 39 when the planetary gear 72 rotates through the planetary gear bearing 39 around the support pin 37. In addition, in a case where a rotational speed of the planetary gear 72 is fast, the lubricant oil reserved in each of the oil reservoirs 72A spreads out due to a function of a centrifugal force, and the droplet lubricant oil drops down to the planetary gear bearing 39 for substantial oil supply.

Denoted at 73 is a carrier adopted in the third embodiment, and the carrier 73 is configured substantially in the same way with the carrier 38 described in the first embodiment, and includes annular support plates 73A and 73B, a plurality of pin mounting hole portions 73C and 73D, a plurality of connecting portions 73E and female splines 73F. However, the carrier 73 in this case differs from that in the first embodiment in a point where a plurality of oil guide groove portions 73G are formed in an end surface of the support plate 73A axially opposing the oil reservoir 72A of the planetary gear 72. Each of the oil guide groove portions 73G is arranged in a position substantially in agreement with each of the oil guide groove portions 74F of the cylindrical coupling member 74 to be described later, and is configured of a radial groove extending to a radial outside around the rotational shaft 17, for example. Each of the oil guide groove portions 73G is arranged in such a position that an end portion of the radial outside axially opposes the planetary gear bearing 39. That is, each of the oil guide groove portions 73G radially extends from a side of the opposing surface portion 74E of the cylindrical coupling member 74 to a side of the each of the support pins 37, and guides a part of lubricant oil ejected from the meshing part 40 between the sun gear 71 and each of the planetary gears 72, in between each of the planetary gears 72 and each of the support pins 37.

Denoted at 74 is the cylindrical coupling member removably provided between the opening side of the spindle 14 and the carrier 73, and the cylindrical coupling member 74 is configured substantially in the same way with the cylindrical coupling member 53 described in the first embodiment. The cylindrical coupling member 74 includes first male spline (not shown), second male spline 74B, an annular step portion (not shown), a stepped hole 74D, and an opposing surface portion 74E. That is, the opposing surface portion 74E of the cylindrical coupling member 74 opposes the meshing part 40 between the sun gear 71 and each of the planetary gears 72 through the axial gap 54.

However, the opposing surface portion 74E of the cylindrical coupling member 74 is provided with a plurality of oil guide groove portions 74F formed to radially extend from the inner diameter side to the oil guide groove portion 73G of the carrier 73. Each of the oil guide groove portions 74F of the cylindrical coupling member 74 and each of the oil guide groove portions 73G of the carrier 73 form part of an oil reservoir for guiding a part of lubricant oil ejected in the direction of an arrow A (refer to FIG. 7) from the meshing part 40 between the sun gear 71 and each of the planetary gears 72 to the planetary gear bearing 39 between each of the planetary gears 72 and each of the support pins 37, and for temporarily reserving the lubricant oil.

The opposing surface portion 74E of the cylindrical coupling member 74 is provided with a dam up portion 74G positioned in a radial inside of each of the oil guide groove portions 74F for damming flow of an oil liquid. The dam up portion 74G functions to suppress the lubricant oil in each of the oil guide groove portions 74F to flow into the stepped hole 74D of the cylindrical coupling member 74 by narrowing the gap 54. Each of the oil guide groove portions 74F is configured such that a radial inside section thereof is closed by the dam up portion 74G and a radial outside section thereof is opened to each of the oil guide groove portions 73G of the carrier 73.

Denoted at 75 is an oil guide path adopted in the third embodiment, and the oil guide path 75 is formed between a one-side end surface of each of the planetary gears 72 and the opposing surface portion 74E of the cylindrical coupling member 74 in the same way with the oil guide path 55 described in the first embodiment. The oil guide path 75 guides lubricant oil ejected in the direction of an arrow A (refer to FIG. 7) from the meshing part 40 between the sun gear 71 and each of the planetary gears 72 to the planetary gear bearing 39 between the planetary gear 72 and the support pin 37, maintaining the planetary gear bearing 39 to be in an oil supplied state. The oil guide path 75 is constituted by each of the oil reservoirs 72A in the planetary gear 72, each of the oil guide groove portions 73G in the carrier 73, and the opposing surface portion 74E, each of the oil guide groove portions 74F and the dam up portion 74G in the cylindrical coupling member 74.

In this manner, even in the third embodiment thus configured, the oil guide path 75 can guide the lubricant oil axially ejected from the meshing part 40 between the sun gear 71 and each of the planetary gears 72 to the planetary gear bearing 39 between the planetary gear 72 and the support pin 37. Therefore, the third embodiment can obtain the operational effect substantially similar to that of the first embodiment.

Particularly, in the third embodiment, the plurality of the oil guide groove portions 73G radially extending are provided in the support plate 73A of the carrier 73, and the plurality of the oil guide groove portions 74F radially extending are provided also in the opposing surface portion 74E of the cylindrical coupling member 74. These oil guide groove portions 73G and 74F are arranged in positions to be communicated with each other. Therefore, the lubricant oil ejected from the meshing part 40 between the sun gear 71 and each of the planetary gears 72 can be guided between each of the planetary gears 72 and each of the support pins 37 along each of the oil guide groove portions 73G and 74F to maintain the planetary gear bearing 39 therebetween to be in a lubricating state.

Further, the plurality of the oil reservoirs 72A formed in the end surface of each of the planetary gears 72 can trap and temporarily reserve therein the lubricant oil ejected from the meshing part 40 between the sun gear 71 and each of the planetary gears 72 through the opposing surface portion 74E of the cylindrical coupling member 74, each of the oil guide groove portions 74F, and the like. Thereby, the oil reservoirs 72A can supply the lubricant oil to the planetary gear bearing 39 between the planetary gear 72 and the support pin 37 with rotation of the planetary gear 72.

It should be noted that in the first and second embodiments, an explanation is made by taking a case where the annular step portion 36A is provided in the planetary gear 36 as an example. However, the present invention is not limited thereto, and, for example, as the planetary gear 72 described in the third embodiment, the plurality of the oil reservoirs 72A may be formed therein. On the other hand, the lubricant oil is only required to be capable of being supplied between the planetary gear and the support pin, and the planetary gear without the annular step portion 36A or the oil reservoir 72A may be used.

In the first embodiment, an explanation is made by taking a case where the cylindrical coupling member 53 is provided with the male splines 53A and 53B, and the spindle 14 and the carrier 38 are spline-coupled, as an example. However, the present invention is not limited thereto, and, for example, the spindle and the cylindrical coupling member may be coupled by rotation-preventive means such as a key. In this case, the same method can be applied between the carrier and the cylindrical coupling member. In this regard, the same method can be applied to the second and third embodiments.

Each of the aforementioned embodiments is explained by taking a case where the reduction gear mechanism 24 is configured by the second-stage planetary gear reduction mechanisms 25 and 33, as an example. However, the present invention is not limited thereto, and for example, the reduction gear mechanism may be configured by a first, third or more-stage planetary gear reduction mechanisms.

Further, each of the aforementioned embodiments is explained by taking the dump truck 1 of a rear-wheel drive type as an example. However, the present invention is not limited thereto, and the present invention may be applied to a dump truck of a front-wheel drive type or a four-wheel drive type driving front and rear wheels together.

DESCRIPTION OF REFERENCE NUMERALS

1: Dump truck
2: Vehicle body
3: Vessel
4: Connecting pin
5: Cab
6: Front wheel
7: Rear wheel (Wheel)
8: Engine
9: Hoist cylinder
10: Operating oil tank
11: Travel drive device
12: Axle housing
13: Cylindrical body
14: Spindle
16: Wheel drive motor (Drive source)
17: Rotational shaft
18: Wheel mounting cylinder
20, 21: Wheel support bearing
22: Outer drum
23: Long bolt
24: Reduction gear mechanism
25, 33: Planetary gear reduction mechanism
34, 61, 71: Sun gear
34A, 61A, 71A: One-side end surface
36, 72: Planetary gear
36A: Annular step portion
37: Support pin
38, 73: Carrier
38G, 53F, 62F: Annular projecting portion
39: Planetary gear bearing
40: Meshing Part
42: Suction pipe
43: Supply pipe
44: Inner retainer
45: Bearing retainer
46: Rotational shaft bearing
47: Wet brake
51: End retainer
53, 62, 74: Cylindrical coupling member
53E, 62E, 74E: Opposing surface portion
54: Gap
55, 63, 75: Oil guide path
62G: Guide projection
62H: Notch
72A: Oil reservoir
73G, 74F: Oil guide groove portion
74G: Dam up portion
100: Lubricant oil

What is claimed is:

1. A travel drive device for a dump truck comprising:

an axle housing mounted in a non-rotating state on a vehicle body of a dump truck and having an end side opened to form a cylindrical spindle;

a rotational shaft provided to axially extend in said spindle of said axle housing and driven and rotated by a drive source;

a wheel mounting cylinder which is rotatably provided on an outer peripheral side of said spindle through wheel support bearings and to which wheels are mounted;

a planetary gear reduction mechanism provided between said wheel mounting cylinder and said spindle to decelerate rotation of said rotational shaft, which is transmitted to said wheel mounting cylinder; and lubricant oil accommodated in a bottom side of said wheel mounting cylinder in a state of being reserved therein to lubricate said planetary gear reduction mechanism, said planetary gear reduction mechanism comprising:

a sun gear arranged on an outer peripheral side of said rotational shaft and rotating with rotation of said rotational shaft;

a plurality of planetary gears meshing with said sun gear for rotation; and a carrier rotatably supporting each of said plurality of said planetary gears through a support pin, said carrier being mounted in a non-rotating state on an open end side of said spindle, wherein:

a cylindrical coupling member formed as a coupling member for connecting said spindle and said carrier is provided between said spindle and said carrier and said rotational shaft is inserted in an inner peripheral side of said cylindrical coupling member, said cylindrical coupling member is provided with an opposing surface portion positioned higher than a liquid surface level of said lubricant oil and, opposing through an axial gap, a meshing part is provided between said sun gear and each of said planetary gears, an oil guide path is formed between each of said planetary gears and said opposing surface portion and guides said lubricant oil ejected from said meshing part between each of said planetary gears and each of said support pins, said sun gear is configured such that an axial one-side end surface projects closer to an axial one side of said opposing surface portion of said cylindrical coupling member than an end surface of each of said planetary gears, said gap being formed narrower than said oil guide path, and said gap is configured to form a dam in such a manner that said lubricant oil ejected from said meshing part flows toward said oil guide path.

2. A travel drive device for a dump truck according to claim 1, wherein each of said planetary gears is provided with an annular step portion extending over an entire circumference between an outer diameter side section meshing with said sun gear and an inner diameter side section supported through a planetary gear bearing by said support pin, wherein said annular step portion forms a part of said oil guide path for guiding said lubricant oil ejected from said meshing part between said sun gear and each of said planetary gears in between each of said planetary gears and each of said support pins.

3. A travel drive device for a dump truck according to claim 1, wherein each of said planetary gears is provided with a plurality of oil reservoirs formed in a one-side end surface axially opposing said opposing surface portion of said cylindrical coupling member, wherein each of said oil reservoirs temporarily reserves said lubricant oil ejected from said meshing part between said sun gear and each of said planetary gears therein to form a part of said oil guide path.

4. A travel drive device for a dump truck according to claim 1, wherein said opposing surface portion of said cylindrical coupling member is provided with a guide projection for beating off said lubricant oil ejected from said meshing part between said sun gear and each of said planetary gears toward a radial outside.

5. A travel drive device for a dump truck according to claim 1, wherein said opposing surface portion of said cylindrical coupling member is provided with a plurality of oil guide groove portions radially extending from an inner peripheral side of said opposing surface portion toward said carrier to guide said lubricant oil ejected from said meshing part between said sun gear and each of said planetary gears in between each of said planetary gears and each of said support pins.

6. A travel drive device for a dump truck according to claim 1, wherein a surface of said carrier opposing said planetary gear is provided with a plurality of oil guide groove portions radially extending from a side of said opposing surface portion of said cylindrical coupling member to a side of each of said support pins to guide said lubricant oil ejected from said meshing part between said sun gear and each of said planetary gears in between each of said planetary gears and each of said support pins.

* * * * *